(12) United States Patent
Tominaga et al.

(10) Patent No.: US 10,823,705 B2
(45) Date of Patent: Nov. 3, 2020

(54) DIAGNOSTIC DEVICE, DIAGNOSTIC SYSTEM, DIAGNOSTIC METHOD, AND COMPUTER-READABLE RECORDING MEDIUM

(71) Applicant: NEC Corporation, Tokyo (JP)

(72) Inventors: Shin Tominaga, Tokyo (JP); Masatake Takahashi, Tokyo (JP); Junichiro Mataga, Tokyo (JP); Hirofumi Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/329,124

(22) PCT Filed: Jul. 29, 2015

(86) PCT No.: PCT/JP2015/003818
§ 371 (c)(1),
(2) Date: Jan. 25, 2017

(87) PCT Pub. No.: WO2016/017168
PCT Pub. Date: Feb. 4, 2016

(65) Prior Publication Data
US 2017/0205376 A1    Jul. 20, 2017

(30) Foreign Application Priority Data
Jul. 30, 2014   (JP) ................................ 2014-154522

(51) Int. Cl.
*G01N 29/07* (2006.01)
*G01H 5/00* (2006.01)
(Continued)

(52) U.S. Cl.
CPC ............... *G01N 29/07* (2013.01); *G01H 5/00* (2013.01); *G01N 29/348* (2013.01);
(Continued)

(58) Field of Classification Search
CPC .......... G01F 1/66; G01B 17/02; G01N 29/00; G01N 17/006; G01S 5/186; G07C 3/00
(Continued)

(56) References Cited

U.S. PATENT DOCUMENTS

| | | | | |
|---|---|---|---|---|
| 5,608,845 A | * | 3/1997 | Ohtsuka | G07C 3/00 702/34 |
| 2006/0266127 A1 | * | 11/2006 | Gysling | G01F 1/66 73/861.23 |

(Continued)

FOREIGN PATENT DOCUMENTS

| JP | H11-108720 A | 4/1999 |
|---|---|---|
| JP | 2002-328119 A | 11/2002 |

(Continued)

OTHER PUBLICATIONS

International Search Report, Corresponding to PCT/JP2015/003818, dated Oct. 20, 2015, 1 page.

(Continued)

*Primary Examiner* — Regis J Betsch
*Assistant Examiner* — Kaleria Knox
(74) *Attorney, Agent, or Firm* — Wilmer Cutler Pickering Hale and Dorr LLP

(57) ABSTRACT

This invention provides the following: a diagnostic device that may, with a simple design, diagnose the condition of a wide area of a structure such as a pipe; and the like. The diagnostic device 100 has a determining means for determining the condition of the structure on the basis of the speed of sound therein.

10 Claims, 17 Drawing Sheets

(51) Int. Cl.
*G01N 29/34* (2006.01)
*G01N 29/44* (2006.01)

(52) U.S. Cl.
CPC ... *G01N 29/4436* (2013.01); *G01N 2291/011* (2013.01); *G01N 2291/0258* (2013.01); *G01N 2291/0289* (2013.01); *G01N 2291/2634* (2013.01)

(58) Field of Classification Search
USPC ...................................................... 73/861.23
See application file for complete search history.

(56) References Cited

U.S. PATENT DOCUMENTS

| | | | | |
|---|---|---|---|---|
| 2006/0288756 A1* | 12/2006 | De Meurechy | ...... | G01N 17/006 73/1.01 |
| 2014/0025319 A1* | 1/2014 | Farhadiroushan | ...... | G01S 5/186 702/56 |
| 2017/0205376 A1 | 7/2017 | Tominaga et al. | | |

FOREIGN PATENT DOCUMENTS

| | | | |
|---|---|---|---|
| JP | 2002328119 | * | 11/2002 |
| JP | 2003-130854 A | | 5/2003 |
| JP | 2004-061361 A | | 2/2004 |
| JP | 2007-003537 A | | 1/2007 |
| JP | 2008-064540 A | | 3/2008 |
| JP | 2013-044523 A | | 3/2013 |
| JP | 2013044523 | * | 4/2013 |
| JP | WO2014050618 | * | 4/2014 |
| WO | WO-2014/050618 A1 | | 4/2014 |

OTHER PUBLICATIONS

United Kingdom Examination Report issued in GB Application No. 1700948.1, dated Aug. 26, 2020, 2 pages.

* cited by examiner

VIBRATION WAVEFORM AT TIME t1

VIBRATION WAVEFORM AT TIME t2

DIAGNOSTIC DEVICE, DIAGNOSTIC SYSTEM, DIAGNOSTIC METHOD, AND COMPUTER-READABLE RECORDING MEDIUM

CROSS-REFERENCE TO RELATED APPLICATIONS

The present application is a national stage application of International Application No. PCT/JP2015/003818 entitled "Diagnostic Device, Diagnostic System, Diagnostic Method, and Computer-Readable Recording Medium" filed on Jul. 29, 2015, which claims the benefit of priority from Japanese Patent Application No. JP2014-154522, filed on Jul. 30, 2014, the disclosures of which are incorporated herein in their entirety by reference thereto.

TECHNICAL FIELD

The present invention relates to a diagnostic device, a diagnostic system, a diagnostic method, and a computer-readable recording medium.

BACKGROUND ART

Structures such as pipes and bridges pose various problems resulting from deterioration. For example, pipes may crack due to deterioration, resulting in leakage of fluids flowing through them. For structures such as pipes, the state of deterioration is desirably detected before problems arise resulting from deterioration.

Structures such as pipes often have a large scale. It is not always easy to detect the state of deterioration for these structures because, for example, pipes are buried underground. Therefore, to efficiently diagnose deterioration of structures such as pipes, detection devices such as various sensors that detect the condition of the structures such as pipes may desirably detect the condition of wide areas of the structures easily.

PTL 1 discloses a pipe inspection method for measuring the thickness of a pipe on the basis of the time to propagate ultrasonic wave to inspect two pipes for abnormalities in their bonding.

PTL 2 discloses a pipe inspection method for obtaining the thickness of a pipe on the basis of the difference in appearance time between a dispersive signal element and a non-dispersive signal element that propagate through two spots.

PTL 3 discloses a pipe inspection method for using a plurality of ultrasonic wave probes arranged in the circumferential direction of a pipe to obtain the waveform of a guide wave in the circumferential mode of the pipe and, in turn, obtain the depth of a thin portion in the pipe on the basis of the amplitude of this waveform.

PTL 4 discloses a gas meter that calculates the speed of sound in a gas on the basis of the time to propagate ultrasound exchanged between an ultrasound transmitter/receiver located with spacings between them in the gas route of a conduction path, and issues an alarm upon detection of an abnormality in the speed of sound in the gas.

PTL 5 discloses a pipe damage probing device that probes a pipe such as a gas pipe or a water pipe as a target using a sound wave for the position of damage inflicted on it.

CITATION LIST

Patent Literature

[PTL 1] Japanese Unexamined Patent Application Publication No. 2003-130854

[PTL 2] Japanese Unexamined Patent Application Publication No. 2007-003537

[PTL3] Japanese Unexamined Patent Application Publication No. 2008-064540

[PTL 4] Japanese Unexamined Patent Application Publication No. H11-108720

[PTL 5] Japanese Unexamined Patent Application Publication No. 2004-061361

SUMMARY OF INVENTION

Technical Problem

The pipe inspection method disclosed in PTL 1 may be used to inspect only the thickness of the pipe around the sensor mount portion. Therefore, the pipe inspection method disclosed in PTL 1 may not be used to inspect the thickness of the pipe in the pipe axial direction.

The pipe inspection method disclosed in PTL 2 requires directly locating the element in the pipe. It is, therefore, sometimes difficult to use the pipe inspection method disclosed in PTL 2 in inspecting a pipe buried underground. The pipe inspection method disclosed in PTL 2 further requires exciting a non-dispersive elastic wave and a dispersive elastic wave and thus uses a complicated configuration.

The pipe inspection method disclosed in PTL 3 requires a plurality of sensor groups and thus uses a complicated device configuration. The method disclosed in PTL 3 may be used to identify the position of a thin portion having a relatively small thickness, but is irrelevant to how the depth of the thin portion is obtained.

The gas meter disclosed in PTL 4 requires calculating the speed of sound in a gas flowing through the gas conduction path. The technique disclosed in PTL 4, in turn, requires locating an ultrasound transmitter/receiver inside the gas conduction portion.

In other words, the techniques disclosed in PTLs 1 to 5 may be used to diagnose only deterioration within a limited range of the structure such as a pipe, or use a complicated structure.

The present invention has been made in order to solve the above-described problem, and has as its main object to provide a diagnostic device that may, with a simple design, diagnose the condition of a wide area of a structure such as a pipe, and the like.

Solution to Problem

A diagnostic device in an aspect of the present invention includes a determining means for determining a condition of a pipe based on a sound speed of vibration propagating through a structure.

A diagnostic system in an aspect of the present invention includes the above-mentioned diagnostic device, and at least one vibration detection unit that detects vibration of a structure.

A diagnostic method in an aspect of the present invention includes determining a condition of a structure based on a speed of sound in the structure.

A computer-readable recording medium in an aspect of the present invention non-transitorily stores a program for causing a computer to perform a process of determining a condition of a structure based on a speed of sound in the structure.

Advantageous Effects of Invention

The present invention may provide a diagnostic device that may, with a simple design, diagnose the condition of a wide area of a structure such as a pipe, and the like.

BRIEF DESCRIPTION OF DRAWINGS

FIG. 18 is a diagram illustrating an exemplary information processing device for implementing the diagnostic device in each example embodiment of the present invention and the like.

DESCRIPTION OF EMBODIMENTS

First Example Embodiment

Figure 18:
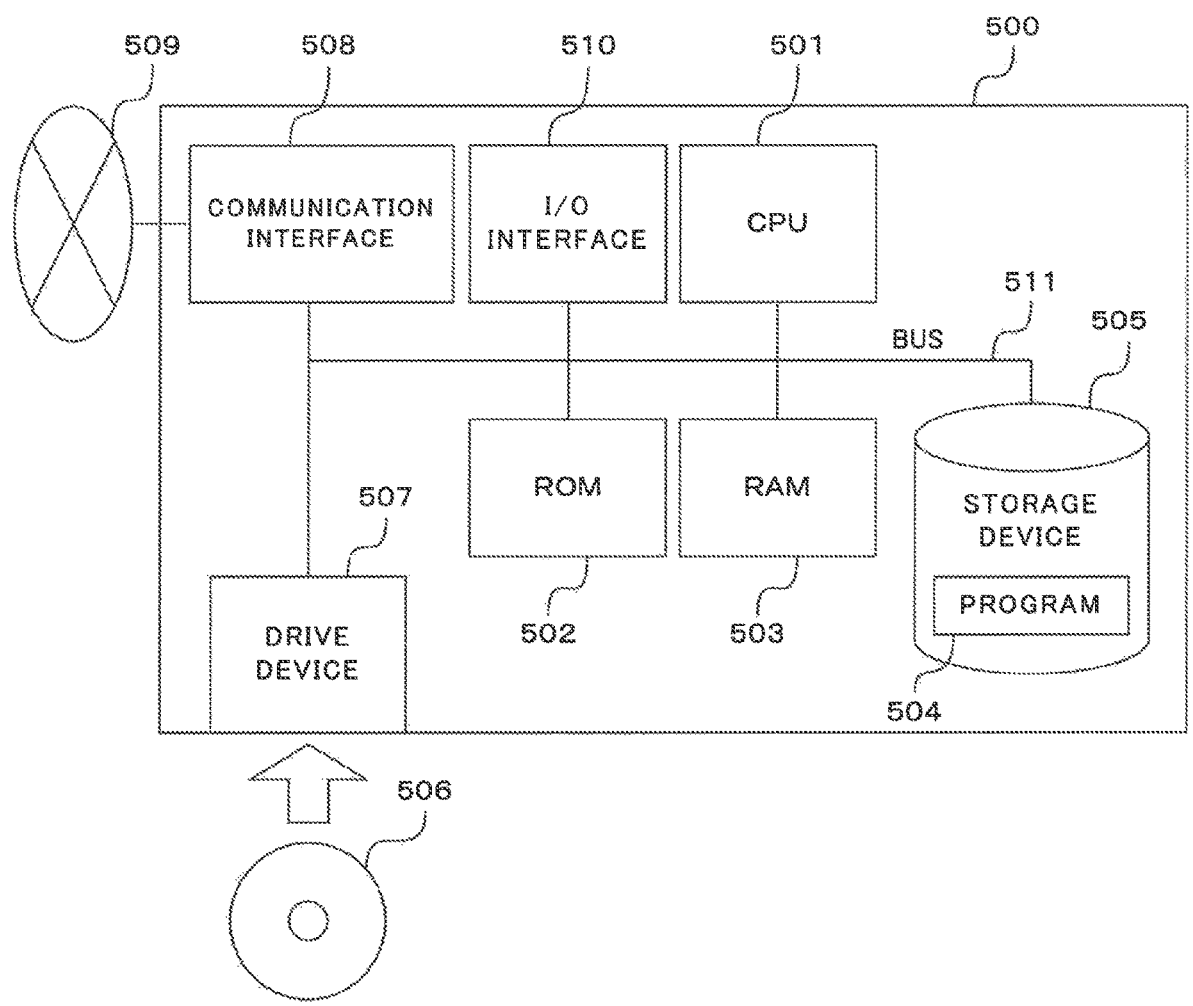

Each example embodiment of the present invention will be described below with reference to the accompanying drawings. In each example embodiment of the present invention, components constituting each device represent functional unit blocks. Components constituting each device may be implemented by any combination of software and an information processing device 500 as illustrated in, for example, FIG. 18. The information processing device 500 includes, as an example, the following configuration.

CPU (Central Processing Unit) 501
ROM (Read Only Memory) 502
RAM (Ramdom Access Memory) 503
a program 504 loaded into the RAM 503
a storage device 505 that stores the program 504
a drive device 507 that performs read and write on a storage medium 506
a communication interface 508 connected to a communication network 509
an I/O interface 510 that inputs and outputs data
a bus 511 that connects respective components together Various modifications are available to implement each device. Each device may be implemented as, for example, a dedicated device. Each device may even be implemented in a combination of a plurality of devices.

Each example embodiment of the present invention are explained using an examples that the structure to be determined by a diagnostic device and the like is a pipe through which a fluid flows, such as water supply pipes or gas pipes.

Figure 1:
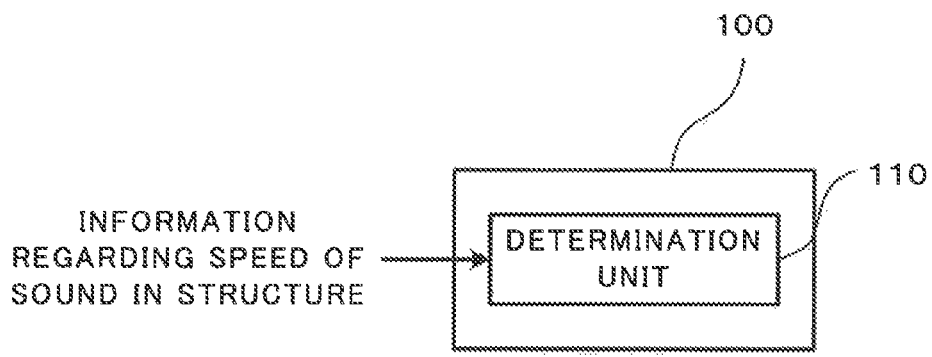
FIG. 1 is a diagram illustrating a diagnostic device according to a first example embodiment of the present invention.
Figure 2:
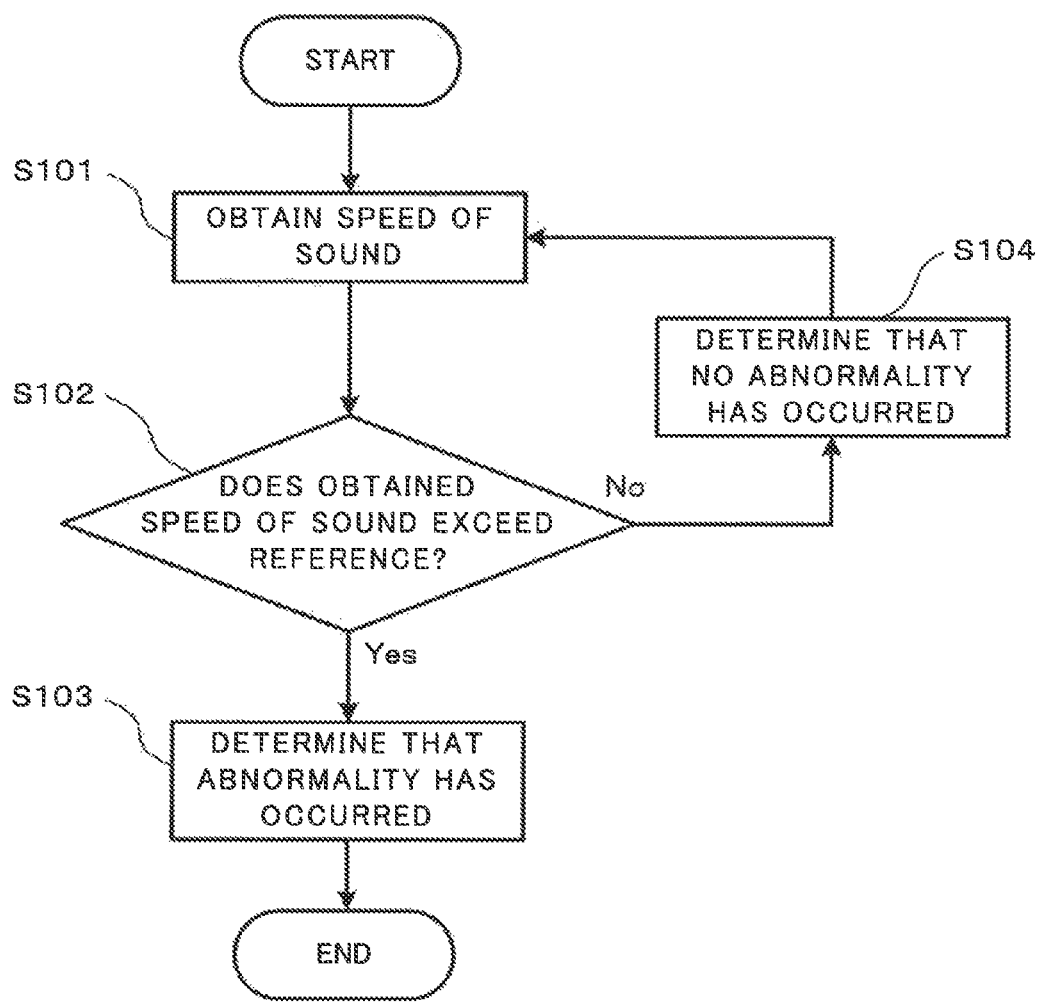
FIG. 2 is a flowchart illustrating an operation of the diagnostic device according to the first example embodiment of the present invention.
Figure 3A:
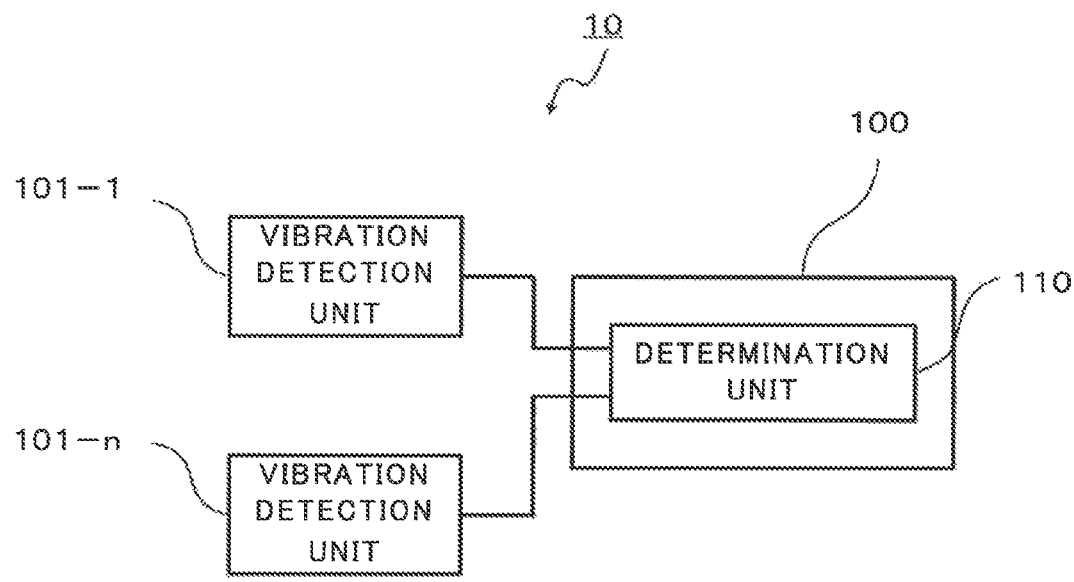
FIG. 3A illustrates an exemplary diagnostic system including the diagnostic device according to the first example embodiment of the present invention.
Figure 3B:
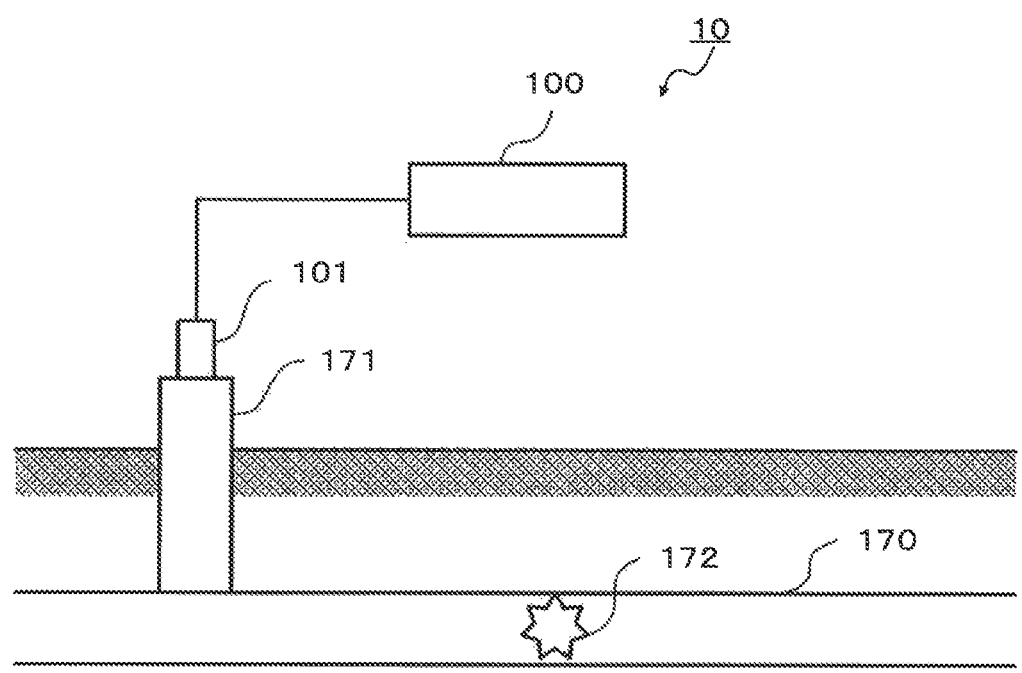
FIG. 3B illustrates the exemplary diagnostic system including the diagnostic device according to the first example embodiment of the present invention.

A first example embodiment of the present invention will be described first. FIG. 1 is a diagram illustrating a configuration of a diagnostic device according to the first example embodiment of the present invention. FIG. 2 is a flowchart illustrating an operation of the diagnostic device according to the first example embodiment of the present invention. FIGS. 3A and 3B illustrate an exemplary diagnostic system including the diagnostic device according to the first example embodiment of the present invention.

As illustrated in FIG. 1, a diagnostic device 100 according to the first example embodiment of the present invention includes a determination unit 110 that determines the condition of a structure such as a pipe based on the speed of sound in the structure. As an example, the diagnostic device 100 may be implemented as a computer including a CPU and a memory. The diagnostic device 100 may also be implemented as a program executed on a server, a PC (Personal Computer), a microcomputer or the like connected to a network. The diagnostic device 100 may even be implemented as a logic circuit of hardware.

The determination unit 110 determines the condition of the structure such as a pipe based on the speed of sound (the speed of propagation of an elastic wave) in the structure. As an example, the determination unit 110 may determine that an abnormality has occurred in the structure such as a pipe when the speed of sound in the pipe or the like is lower than a reference threshold. The determination unit 110 may even determine that an abnormality has occurred in the pipe or the like when the speed of sound in the pipe is higher than a reference threshold. In other words, the threshold used by the determination unit 110 represents the upper limit or lower limit of the speed of sound in the structure or the like when no abnormality has occurred in the pipe or the like (that is, the pipe is normal). The determination unit 110 determines that an abnormality has occurred in the structure such as the pipe when the speed of sound in the pipe or the like exceeds the threshold (the speed of sound in the structure such as the pipe is higher or lower than the threshold). The determination unit 110 may determine the condition of the structure using either the threshold representing the upper limit or the threshold representing the lower limit described above, or determine the condition of the structure using both the threshold representing the upper limit and the threshold representing the lower limit described above.

In this case, the threshold is determined on the basis of the material and thickness of a pipe to be determined, surrounding conditions of the pipe (the soil surrounding the pipe when it is buried underground) and the like. The threshold may be determined in a single step or multiple steps for the upper limit or the lower limit as described above. When the threshold is determined in multiple steps, the determination unit 110 may determine the degree of abnormality in the structure such as a pipe, in accordance with any of the multiple-step thresholds when the speed of sound in the pipe or the like is higher or lower than this threshold.

Next, an exemplary operation of the diagnostic device 100 according to the present example embodiment will be described below with reference to FIG. 2.

In the diagnostic device 100, the determination unit 110 first determines a speed of sound in the structure such as a pipe (step S101). In this case, the determination unit 110 may obtain an externally calculated speed of sound in the structure such as a pipe, or may obtain externally obtained information regarding the speed of sound in the structure such as a pipe and calculate a speed of sound in the structure such as a pipe on the basis of the information obtained.

The determination unit 110 determines, for example, whether the speed of sound in the structure such as a pipe that is determined exceeds a reference threshold speed of sound (that is, the speed of sound in the structure such as a pipe is higher or lower than the threshold) (step S102). When the speed of sound in the structure such as a pipe exceeds the threshold (Yes in step S102), the determination unit 110 determines that an abnormality has occurred in the pipe to be determined. In this case, the diagnostic device 100 may notify the external that an abnormality has occurred, for example. The diagnostic device 100 may identify the position at which an abnormality has occurred, using a known method or the like.

When the derived speed of sound in the structure such as a pipe does not exceed the predetermined threshold in step S102 (No in step S102), the determination unit 110 determines that no abnormality has occurred in the pipe to be determined. In this case, the diagnostic device 100 returns to step S101, and obtains a speed of sound.

The principle of determining the condition of the structure such as a pipe based on the speed of sound in the pipe or the like will be described herein. The speed of sound propagating through the pipe is determined in a manner that depends on the mechanical propagation property of the structure such as a pipe determined by the factors associated with the pipe or the like including the material and shape of the pipe, and the surrounding environments such as the soil surrounding the pipe. The pipe may corrode with time, or deteriorate due to rust, change in thickness, or become cracked or scratched as a fluid flows through the pipe, for example. In this manner, when the pipe changes in thickness and the like, its mechanical propagation property changes. Changes in mechanical propagation property of the pipe results in change of the speed of sound in the pipe. More specifically, the speed of sound may decrease or increase due to changes in the mechanical propagation property of the pipe with time and the like, as described above. Therefore, when the speed of sound in the pipe decreases or increases in excess of a certain threshold, for example, it may be determined that the deterioration of the pipe has worsened.

The diagnostic device 100 may thus determine the condition of the pipe and the occurrence of an abnormality on the basis of the speed of sound in the pipe. The diagnostic device 100 may also determine temporal changes in condition of the pipe on the basis of temporal changes in speed of sound in the pipe.

An example of a diagnostic system 10 including the diagnostic device 100 according to the present example embodiment will be described below with reference to FIGS. 3A and 3B. Referring to FIG. 3A, the diagnostic system 10 includes the diagnostic device 100 in the present example embodiment and at least one vibration detection unit 101 that detects vibration of a pipe 170 serving as a structure. In the example illustrated in FIGS. 3A and 3B, the pipe 170 is buried underground. The vibration detection unit 101 is attached to an ancillary equipment 171 such as a fire hydrant or a water stop valve mounted on the pipe 170. The ancillary equipment 171 is not limited to a fire hydrant, a water stop valve or the like as long as vibration propagates to it from the pipe 170.

The vibration detection unit 101 detects vibration propagating through the pipe. The vibration detection unit 101 may use, for example, a piezoelectric vibration sensor, but not limited to this. Information regarding the detected vibration propagating through the pipe is sent to the diagnostic device 100 by a communication means (not illustrated), for example. When vibration propagating through the pipe 170 is detected by the vibration detection unit 101, the speed of sound in the pipe may be obtained from the relation between the position of the source of the vibration and the position at which vibration of the pipe 170 is detected by the vibration detection unit 101, and the time taken for the vibration to propagate. In other words, in the diagnostic device 100, the determination unit 110 may determine the condition of the pipe based on the speed of sound obtained from the vibration detected by the vibration detection unit 101. The speed of sound obtained using the vibration detected by the vibration detection unit 101 is the speed of sound of the pipe 170 between the position of the source of the vibration and the position at which vibration is detected by the vibration detection unit 101. The determination unit 110 may determine the condition of the pipe 170 not only at the position where vibration is detected by the vibration detection unit 101 but also at a position away from the position where the vibration is detected by the vibration detection unit 101, based on the speed of sound which is obtained.

The vibration detection unit 101 need only to be capable of detecting vibration of the pipe, and may be set at any location that allows detection of vibration of the pipe. As an example, the vibration detection unit 101 is attached to an ancillary equipment 171 such as a fire hydrant or a water stop valve mounted on the pipe, as illustrated in FIG. 3B. Note, however, that the vibration detection unit 101 may be attached to a portion other than the ancillary equipment 171 as long as it may detect vibration of the pipe, and it may be directly attached to the pipe 170, for example. The vibration detection unit 101 may even detect vibration of the pipe at a position away from the pipe 170 or the ancillary equipment 171, as long as it may detect vibration of the pipe.

In the diagnostic system 10, at least one vibration detection unit 101 is provided, as illustrated in FIG. 3B. Note that, however, two or more vibration detection units 101 may be provided in accordance with the method for determining the speed of sound and the like. The diagnostic system 10 may even include a plurality of vibration detection units 101. In this case, the diagnostic system 10 may be configured to select a vibration detection unit 101 proximate to the position at which the condition of the pipe is desired to be detected among the plurality of vibration detection units 101, and determine the condition of the pipe using vibration detected by the vibration detection unit 101 which is selected as above.

As described above, the diagnostic device 100 according to the present example embodiment determines the condition of the structure such as a pipe on the basis of the speed of sound. Thus, the diagnostic device 100 according to the present example embodiment may determine the condition of the pipe or the like, its changes, and the occurrence of an abnormality in the pipe or the like. The speed of sound is derived based on vibration detected by the vibration detection unit 101 in the diagnostic system 10, for example. The vibration detection unit 101 need not always be directly attached to the pipe as long as it may detect vibration of the pipe. The speed of sound in the structure such as a pipe is easily determined using information regarding the vibration detected by the vibration detection unit 101. The speed of sound obtained from the vibration detected by the vibration detection unit 101 is the speed of sound between the position of the source of the vibration and the position where the vibration of the pipe is detected by the vibration detection unit 101. Therefore, the diagnostic device 100 according to the present example embodiment may determine the condition of a wide area of the pipe by determining the condition of the pipe based on the speed of sound in the structure such as a pipe.

In other words, the diagnostic device 100 according to the present example embodiment and the diagnostic system 10 including the diagnostic device 100 may determine the condition of a wide area of the structure such as a pipe with a simple configuration.

Second Example Embodiment

Figure 4:
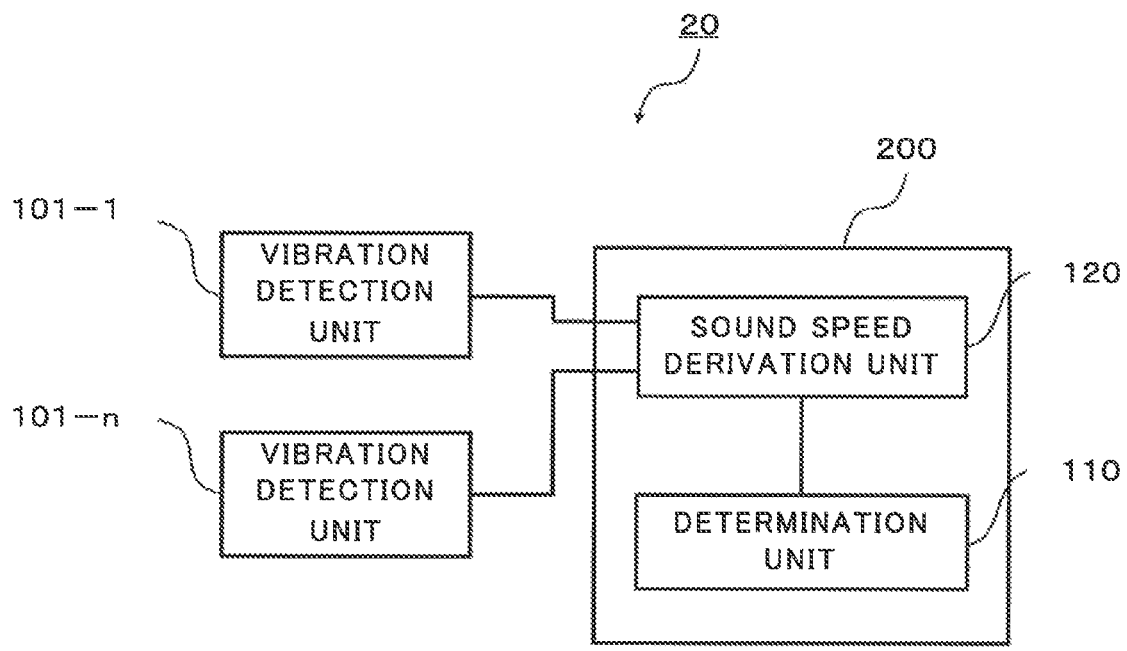
FIG. 4 is a block diagram illustrating a configuration of a diagnostic device according to a second example embodiment of the present invention.
Figure 5:
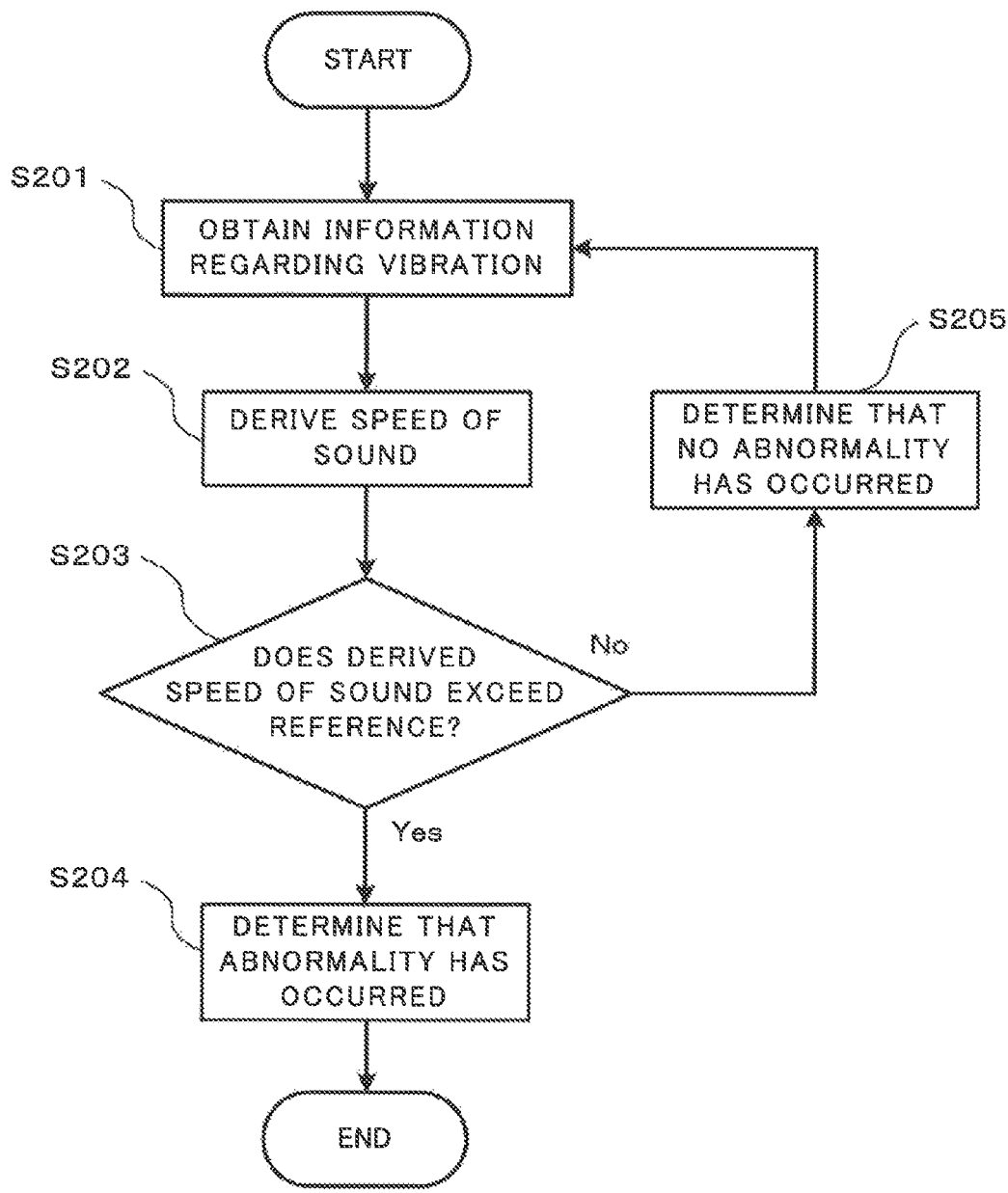
FIG. 5 is a flowchart illustrating an operation of the diagnostic device according to the second example embodiment of the present invention.
Figure 6:
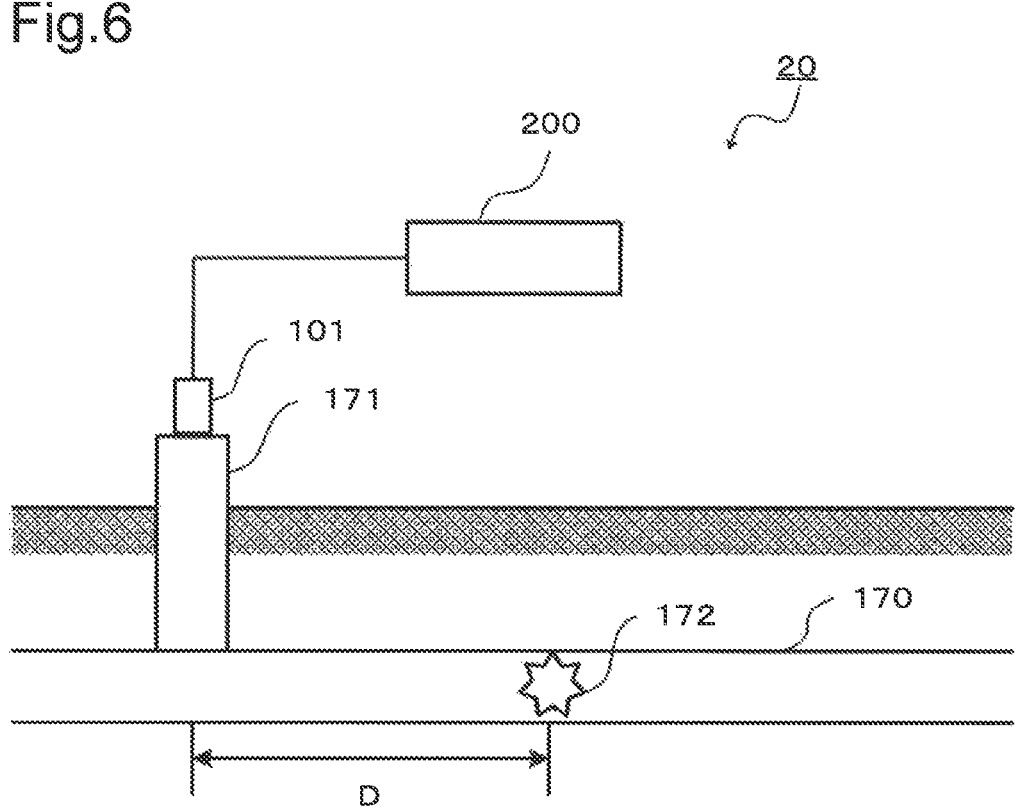
FIG. 6 is a diagram illustrating an exemplary method for deriving a speed of sound by the diagnostic device according to the second example embodiment of the present invention.

Next, a second example embodiment of the present invention will be described next. FIG. 4 is a block diagram illustrating configurations of a diagnostic device and a diagnostic system according to the second example embodiment of the present invention. FIG. 5 is a flowchart illustrating an operation of the diagnostic device according to the second example embodiment of the present invention. FIG. 6 is a diagram illustrating an exemplary method for determining a speed of sound by the diagnostic device according to the second example embodiment of the present invention.

Figure 7A:
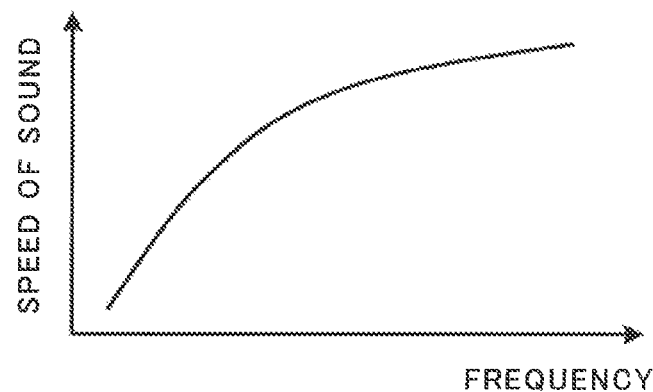
FIG. 7A is a graph representing the relation between the speed of sound in a pipe and the frequency.
Figure 7B:
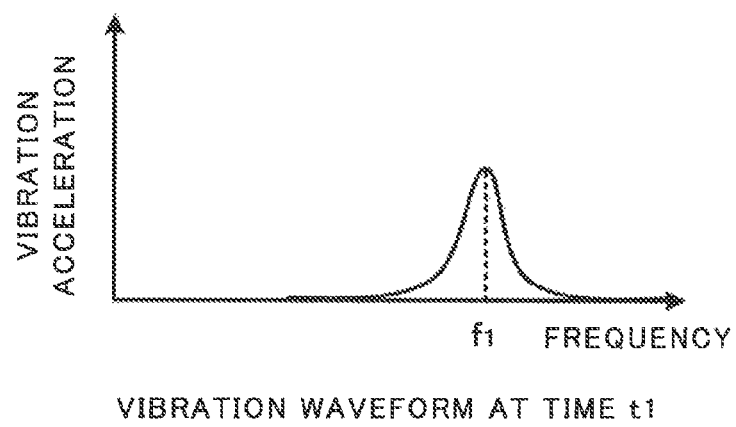
FIG. 7B is a graph representing the relation between the vibration acceleration in the pipe and the frequency.
Figure 7C:
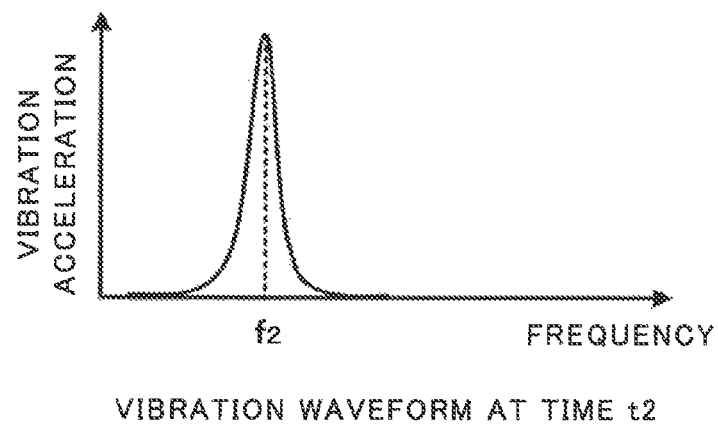
FIG. 7C is a graph representing the relation between the vibration acceleration in the pipe and the frequency.
Figure 8:
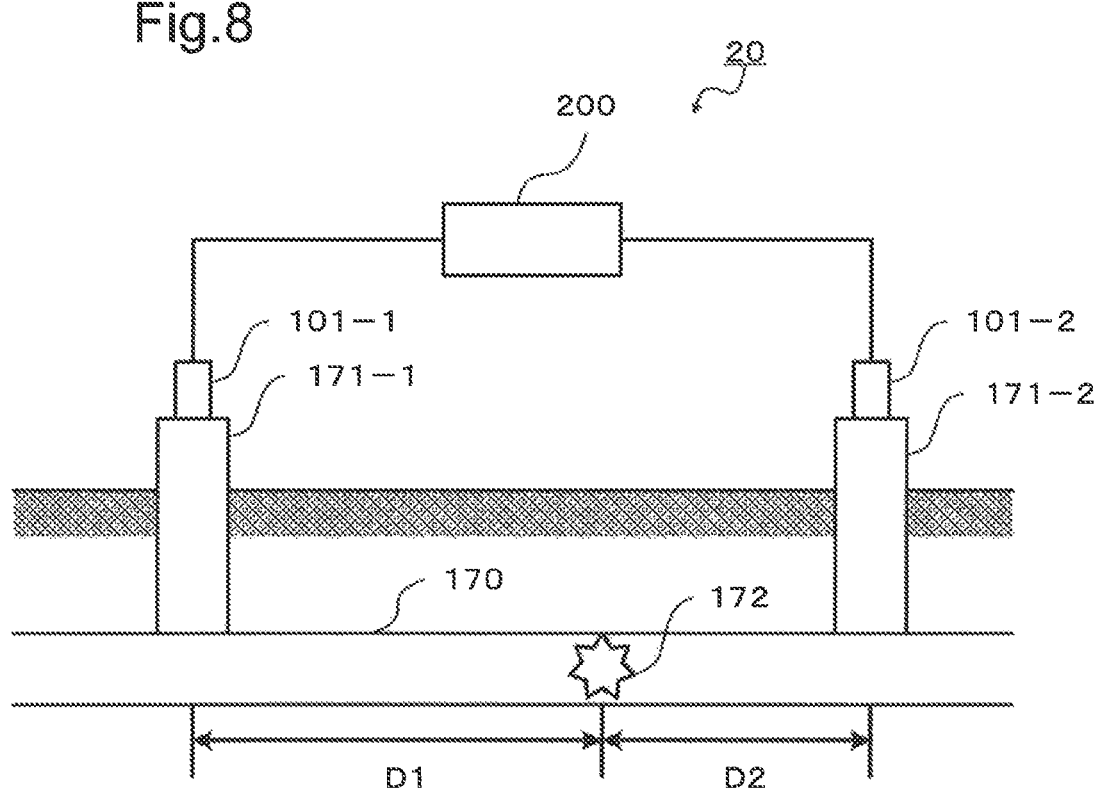
FIG. 8 is a diagram illustrating another exemplary method for deriving a speed of sound by the diagnostic device according to the second example embodiment of the present invention.

FIGS. 7A, 7B, and 7C are graphs each representing the relation between the speed of sound in a pipe and the frequency. FIG. 8 is a diagram illustrating another exemplary method for determining a speed of sound by the diagnostic device in the second example embodiment of the present invention.

A diagnostic device 200 according to the second example embodiment of the present invention includes a sound speed derivation unit 120 and a determination unit 110, as illustrated in FIG. 4. The sound speed derivation unit 120 determines a speed of sound in a structure such as a pipe on the basis of vibration of the structure such as a pipe. The determination unit 110 determines the condition of the structure such as a pipe based on the speed of sound in the pipe or the like determined by the sound speed derivation unit 120.

In other words, the diagnostic device 200 according to the present example embodiment is different from the diagnostic device 100 according to the first example embodiment of the present invention in that the former includes the sound speed derivation unit 120. Other than that, the configuration of the diagnostic device 200 is the similar to that of the diagnostic device 100 according to the first example embodiment of the present invention.

A diagnostic system 20 that uses the diagnostic device 200 according to the second example embodiment of the present invention may be implemented similarly to the diagnostic system 10 that uses the diagnostic device 100 in the first example embodiment of the present invention. The diagnostic system 20 that uses the diagnostic device 200 in the second example embodiment of the present invention includes the diagnostic device 200 and at least one vibration detection unit including vibration detection units 101-1 to 101-*n*.

The sound speed derivation unit 120 determines a speed of sound in the structure such as a pipe based on the vibration of the pipe or the like. The sound speed derivation unit 120 derives a speed of sound in the structure such as a pipe based on the vibration of the pipe detected by at least one of the vibration detection units 101 that detect vibration of the pipe, for example. A specific procedure for determining the speed of sound by the sound speed derivation unit 120 will be described later.

An exemplary operation of the diagnostic device 200 in the present example embodiment will be described below with reference to FIG. 5.

In the diagnostic device 200, the sound speed derivation unit 120 first obtains information regarding vibration of the pipe or the like (step S201). In this case, the sound speed derivation unit 120 may directly obtain information regarding vibration detected by the vibration detection unit 101, for example. The sound speed derivation unit 120 may obtain information having undergone predetermined processing, such as removal of vibration in frequency bands unnecessary to determine the speed of sound on the vibration detected by the vibration detection unit 101. Next, the sound speed derivation unit 120 then determines the speed of sound in the structure such as a pipe based on the information regarding vibration obtained in step S201 (step S202).

Then, the determination unit 110 determines whether the speed of sound in the structure such as a pipe which is determined exceeds a threshold that is a reference speed of sound (step S203), for example. When the speed of sound in the structure such as a pipe exceeds the threshold (Yes in step S203), the determination unit 110 determines that an abnormality has occurred in the pipe to be determined.

When the speed of sound in the structure such as a pipe which is derived does not exceed the predetermined threshold (No in step S203), the determination unit 110 determines that no abnormality has occurred in the pipe or the like to be determined. In this case, the diagnostic device 200 returns to step S201, and obtains the information regarding vibration.

In the present example embodiment, some exemplary procedures for deriving a speed of sound by the sound speed derivation unit 120 will be described below.

In an example, the sound speed derivation unit 120 derives the speed of sound in the pipe on the basis of vibration detected by one vibration detection unit 101, as illustrated in FIG. 6. In this case, a speed of sound in the pipe is derived based on a distance D between a vibration source position 172 and the vibration detection unit 101, and the time taken for vibration to reach the vibration detection unit 101 from the vibration source position 172. More specifically, a speed of sound in the pipe is obtained by dividing the distance D from the vibration source position 172 to the position where the ancillary equipment 171 equipped with the vibration detection unit 101 is mounted on a pipe 170 by the time taken for vibration to reach the vibration detection unit 101 from the vibration source position 172. When deriving the speed of sound in the pipe, the distance D may include the height of the ancillary equipment 171 (that is, the distance from the position where the accessory is in contact with the pipe 170 to the position the vibration detection unit 101 is mounted). In other words, the distance D may be a distance along the propagation path of vibration of the pipe 170 or the like from the vibration source position 172 to the position where the vibration detection unit 101 is disposed.

Vibration of the pipe 170 used to determine the speed of sound in the pipe by the sound speed derivation unit 120 may be generated by, for example, externally applying an impact to the location of the vibration source position 172 in the pipe 170 or its vicinity. For example, directly vibrating the pipe 170 may apply an impact to the pipe 170. When the pipe 170 is buried underground, an impact may be applied to the pipe 170 by vibrating the ground surface close to the position where the pipe 170 is buried. In addition, the sound speed derivation unit 120 may derive the speed of sound in the pipe using vibration generated in the pipe 170 when an impact is applied to the pipe 170 due to any factor, such as when an automobile passes through the ground surface near the position where the pipe 170 is buried. In this example, further, the sound speed derivation unit 120 preferably accurately identifies the time at which vibration has occurred to obtain the difference in vibration reaching time.

In another example, as in the foregoing example, the sound speed derivation unit 120 derives the speed of sound in the pipe based on vibration detected by one vibration detection unit 101, as illustrated in FIG. 6. In this example, the sound speed derivation unit 120 derives the speed of sound based on the difference in speed of sound in the pipe for each frequency, as illustrated in FIG. 7A. As illustrated in FIG. 7A, the speed of sound in the pipe varies for each frequency, and generally, the higher the frequency, the higher the speed of sound in the pipe.

Under the circumstances, the sound speed derivation unit 120 focuses attention on predetermined frequencies f1 and f2, for example. The sound speed derivation unit 120 determines times t1 and t2 at which f1 and f2 of interest respectively satisfy a predetermined condition (for example, the vibration acceleration reaches a peak). For example, the vibration acceleration for the frequency f1 reaches a peak at the time t1, as illustrated in FIG. 7B. The vibration acceleration for the frequency f2 lower than the frequency f1 reaches a peak at the time t2 after the time t1, as illustrated in FIG. 7C. The sound speed derivation unit 120 obtains a value Δt on the basis of the times t1 and t2, as:

$$\Delta t = t2 - t1 \qquad (1)$$

The sound speed derivation unit 120 derives a speed of sound based on Δt obtained by equation (1) and the above-mentioned distance D. In this way, the sound speed derivation unit 120 may accurately derive a speed of sound even when the time at which vibration has occurred may not be identified.

When the vibration source position 172 is the same, the speed of sound changes in accordance with changes in Δt. In this example, when the detection device 200 in the present example embodiment determines temporal changes in condition of the pipe based on the vibration generated at the same vibration source position 172, the determination unit 110 may determine the condition of the pipe on the basis of Δt.

Vibration of the pipe 170 used by the sound speed derivation unit 120 to derive the speed of sound in the pipe may be generated as in the foregoing example.

In still another example, the sound speed derivation unit 120 derives the speed of sound in the pipe based on vibrations detected by the two vibration detection units 101-1 and 101-2, as illustrated in FIG. 8. In this case, the sound speed derivation unit 120 derives a speed of sound in the pipe based on the difference between the times at which vibrations have reached the vibration detection units 101-1 and 101-2, and the difference between the distances D1 and D2 between the vibration source position 172 and the respective positions at which ancillary equipments 171-1 and 171-2 equipped with the vibration detection units 101-1 and 101-2, respectively, are mounted on the pipe 170. More specifically, the speed of sound is obtained by, for example, dividing the difference between the distances D1 and D2 by the difference between the times taken for vibrations to reach the vibration detection units 101-1 and 101-2 from the vibration source position 172. In deriving the speed of sound in the pipe, the distances D1 and D2 may include the height of the ancillary equipments 171-1 or 171-2, like the above-mentioned distance D.

When the vibration source position 172 is outside the interval between the vibration detection units 101-1 and 101-2, the sound speed calculation unit 120 may derive the speed of sound even when no definite vibration source position 172 may be identified. In this case, the area outside the interval between the vibration detection units 101-1 and 101-2 is represented in FIG. 8 as a position on the left of the vibration detection unit 101-1 of the pipe 170 or that on the right of the vibration detection unit 101-2 of the pipe 170. The sound speed calculation unit 120 may derive a speed of sound based the difference between the times taken for vibrations to reach the vibration detection units 101-1 and 101-2 from the vibration source position 172, and the distance between the vibration detection units 101-1 and 101-2.

In either case, vibration of the pipe 170 used to derive a speed of sound in the pipe by the sound speed derivation unit 120 may be generated as in the foregoing example.

Although some exemplary procedures for deriving a speed of sound by the sound speed derivation unit 120 have been described above, the sound speed measurement unit 120 may derive the speed of sound using a procedure different from the above-mentioned procedures. The sound speed measurement unit 120 may derive the speed of sound in the pipe using an appropriate procedure for the pipe or the like targeted for condition determination, the required accuracy, and the like.

As described above, the diagnostic device 200 in the present example embodiment includes the sound speed derivation unit 120. The sound speed derivation unit 120 derives the speed of sound in the structure such as a pipe based on vibration of the structure such as a pipe. A speed of sound in the structure such as a pipe may be easily accurately derived on the basis of vibration of the pipe or the like. Therefore, the diagnostic device 200 in the present example embodiment may determine the condition of the structure easily and accurately. The diagnostic system 20 including the diagnostic device 200 in the present example embodiment has the similar advantageous effect as that of the diagnostic device 200.

Third Example Embodiment

Figure 9:
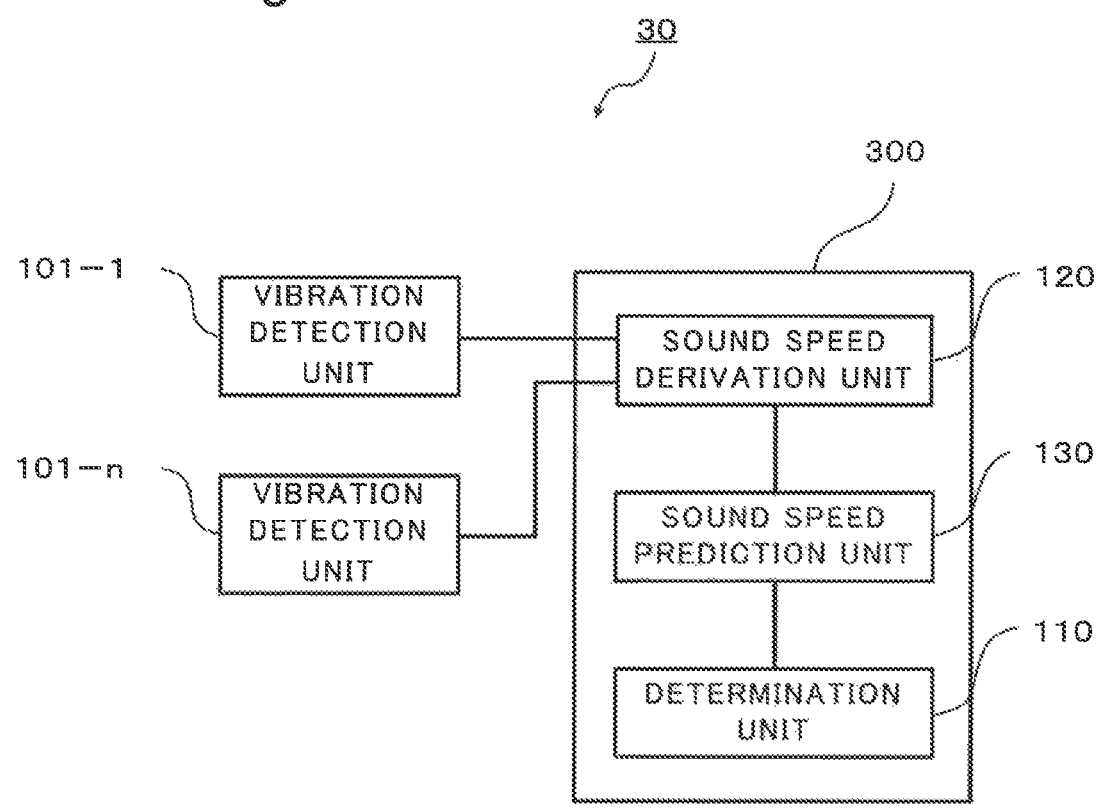
FIG. 9 is a diagram illustrating a configuration of a diagnostic device according to a third example embodiment of the present invention.
Figure 10:
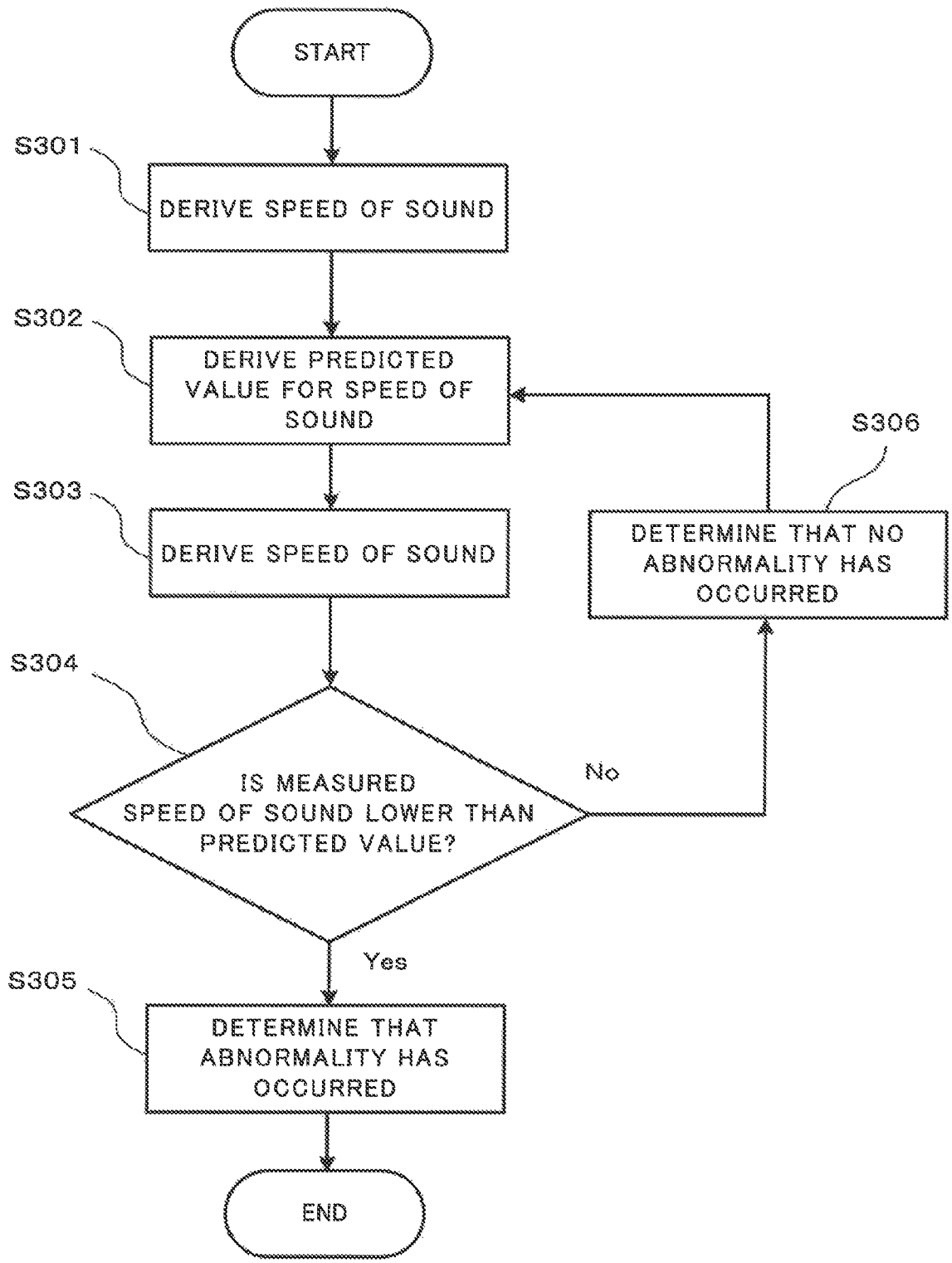
FIG. 10 is a flowchart illustrating an operation of the diagnostic device according to the third example embodiment of the present invention.

A third example embodiment of the present invention will be described next. FIG. 9 is a diagram illustrating configurations of a diagnostic device 300 and a diagnostic system 30 according to the third example embodiment of the present invention. FIG. 10 is a flowchart illustrating an operation of the diagnostic device 300 in the third example embodiment of the present invention.

The diagnostic device 300 according to the third example embodiment of the present invention includes a sound speed derivation unit 120, a sound speed prediction unit 130, and a determination unit 110, as illustrated in FIG. 9. The sound speed derivation unit 120 derives a speed of sound in a structure such as a pipe based on vibration and the like of the structure such as a pipe detected by at least one of vibration detection units 101-1 to 101-n, like the sound speed derivation unit 120 in the second example embodiment of the present invention, for example. The sound speed prediction unit 130 predicts a speed of sound in the structure such as a pipe based on at least the speed of sound in the structure such as a pipe derived by the sound speed derivation unit 120. The determination unit 110 determines the condition of the structure such as a pipe based on a predicted value of the speed of sound obtained by the sound speed prediction unit 130, and the speed of sound in the structure derived by the sound speed derivation unit 120.

In other words, the diagnostic device 300 in the present example embodiment is different from the diagnostic device 200 in the second example embodiment of the present invention in that the former includes the sound speed prediction unit 130. Other than that, the configuration is the same as that of the diagnostic device 200 in the second example embodiment of the present invention and the like.

A diagnostic system 30 that uses the diagnostic device 300 in the third example embodiment of the present invention may be implemented as in the first or second example embodiment of the present invention. The diagnostic system 30 that uses the diagnostic device 300 in the third example embodiment of the present invention includes the diagnostic device 300 and vibration detection units 101-1 to 101-n as at least one vibration detection unit.

The speed of sound in the structure such as a pipe changes, for example, due to aging, or as a fluid flows through the pipe. When the change in the speed of sound falls within a range predicted from aging and the like, this change in the speed of sound may be considered to result from normal aging and the like. For example, the speed of sound in the structure such as a pipe gradually decreases or increases due to aging and the like. However, when the change in the speed of sound falls outside the predicted range (for example, the speed of sound in the structure such as a pipe rapidly decreases), any abnormality such as cracks or bores, may be considered to have occurred in the pipe or the like.

When it is determined that an abnormality has occurred in the case where the speed of the sound in the structure such as a pipe exceeds a predetermined threshold, the threshold changes in a manner that depends on the mechanical propagation property of the pipe or the like, and the surrounding environments such as the soil surrounding the pipe or the like. Thus, it is difficult to uniformly set such a threshold. In contrast to this, in the present example embodiment, the predicted value is obtained for the speed of sound on the basis of at least the speed of sound in the structure such as a pipe. The predicted value is thus obtained in consideration of the influence of the above-mentioned factors associating with the speed of sound.

Therefore, the diagnostic device 300 in the present example embodiment may accurately determine the condition of the pipe in accordance with its property or environments by predicting the speed of sound in the structure such as a pipe and comparing the predicted value obtained by prediction with the speed of sound derived by, for example, detecting vibration of the pipe to.

Next, components constituting the diagnostic device 300 in the present example embodiment will be described below. The sound speed prediction unit 130 first predicts the speed of sound in the structure such as a pipe. The sound speed prediction unit 130 obtains a predicted value by predicting the speed of sound in the structure such as a pipe at any point in time after a predetermined point in time, based on at least the speed of sound in the structure such as a pipe at the predetermined point in time. The predetermined point in time as mentioned above is not limited to one specific point in time, and the sound speed prediction unit 130 may predict based on the speeds of sound in the structure such as a pipe at a plurality of points in time. The sound speed prediction unit 130 may take other factors that influence the speed of sound into consideration in obtaining the predicted value.

The determination unit 110 determines the condition of the structure such as a pipe, on the basis of the value of the speed of sound predicted by the sound speed prediction unit 130 and the speed of sound in the structure derived by the sound speed derivation unit 120. The determination unit 110 may determine the condition of the pipe by, for example, comparing the value of the speed of sound predicted by the sound speed prediction unit 130 with the speed of sound derived by the sound speed derivation unit 120. In this case, the determination unit 110 may determine that an abnormality has occurred in the pipe when the speed of sound derived by the sound speed derivation unit 120 is different (for example, the speed of sound is lower) than the value of the speed of sound predicted by the sound speed prediction unit 130 beyond a predetermined range.

The determination unit 110 determines the condition of the pipe preferably on the basis of the speed of sound at a point in time different from that for the speed of sound used to obtain the predicted value of the speed of sound as mentioned above and the predicted value of the speed of sound. Further, the speed of sound in the pipe and its predicted value used in determination by the determination unit 110 are preferably speeds of sound in the same range of the extending pipe. For example, when the speed of sound is derived on the basis of vibration detected by the vibration detection unit 101, the speed of sound in the pipe used in determination and its predicted value in the determination unit 110 are preferably based on vibration detected by the same vibration detection unit 101. In this case, the number of vibration detection units 101 is not limited to one.

Next, an exemplary operation of the diagnostic device 300 in the present example embodiment will be described below with reference to FIG. 10. In the example illustrated in FIG. 10, the determination unit 110 determines that an abnormality has occurred in the pipe when the speed of sound derived by the sound speed derivation unit 120 is lower than the value of the speed of sound predicted by the sound speed prediction unit 130 beyond a predetermined range.

In the diagnostic device 300, the sound speed derivation unit 120 derives a speed of sound in the structure such as a pipe (step S301). In this case, the sound speed derivation unit 120 derives a speed of sound in the structure such as a pipe on the basis of the vibration detected by the vibration detection unit 101, for example. Next, the sound speed prediction unit 130 predicts a speed of sound in the structure such as a pipe on the basis of at least the speed of sound in the structure such as a pipe derived in step S301 (step S302). Next, the sound speed derivation unit 120 derives a speed of sound in the structure such as a pipe again (step S303). The speed of sound derived in this case is the speed of sound in the structure such as a pipe at a point in time after that for the speed of sound derived in step S301.

Then, the determination unit 110 determines whether the speed of sound in the structure such as a pipe derived in step S303 and the like is lower than the predicted value of the speed of sound obtained in step S302 (step S304). When the speed of sound in the structure such as a pipe is lower than the predicted value (Yes in step S304), the determination unit 110 determines that an abnormality has occurred in the pipe or the like to be determined.

When the derived speed of sound in the structure such as a pipe is higher than the predicted value in step S304 (No in step S304), the determination unit 110 determines that no abnormality has occurred in the pipe or the like to be determined. In this case, the diagnostic device 300 returns to step S302, and predicts the speed of sound in the structure such as a pipe on the basis of the speed of sound derived in step S303.

As described above, the diagnostic device 300 according to the present example embodiment includes the sound speed prediction unit 130. The sound speed prediction unit 130 predicts the speed of sound in the structure such as a pipe based on at least the speed of sound in the structure such as a pipe. The determination unit 110 determines the condition of the structure such as a pipe based on the predicted value of the speed of sound obtained by the sound speed prediction unit 130 and the speed of sound in the structure. In other words, the determination unit 110 may determine the condition of the structure such as a pipe in consideration of aging. Further, the determination unit 110 may more appropriately determine the condition of the pipe or the like in consideration of the environments under which the pipe or the like to be determined is located, variations in performance for each individual vibration detection unit 101 used to derive a speed of sound and the like, than in the case where such determination is done using a threshold. Therefore, the diagnostic device 300 in the present example embodiment may accurately determine the condition of the structure according to the individual conditions of the pipe or the like to be determined. The diagnostic system 30 including the diagnostic device 300 in the present example embodiment has similar advantageous effect as that of the diagnostic device 300.

Fourth Example Embodiment

Figure 11:
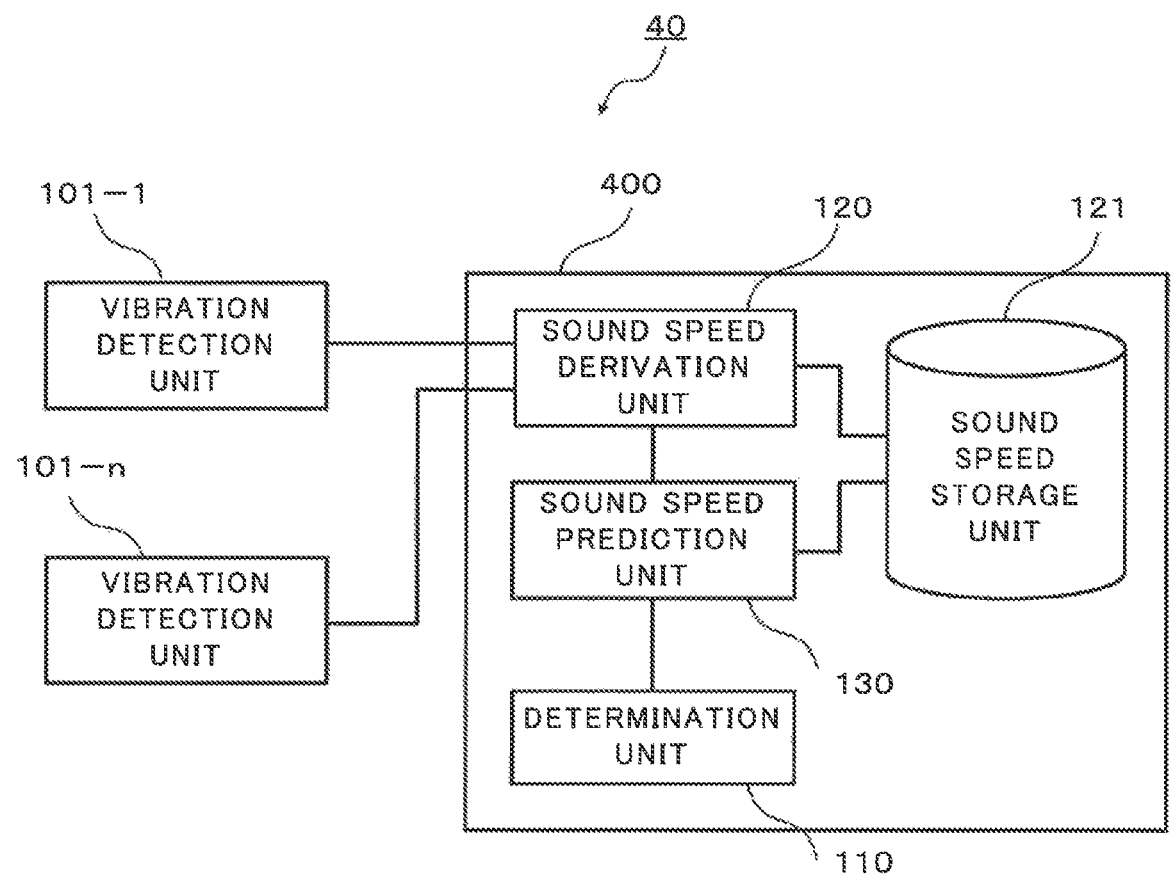
FIG. 11 is a diagram illustrating a configuration of a diagnostic device according to a fourth example embodiment of the present invention.
Figure 12A:
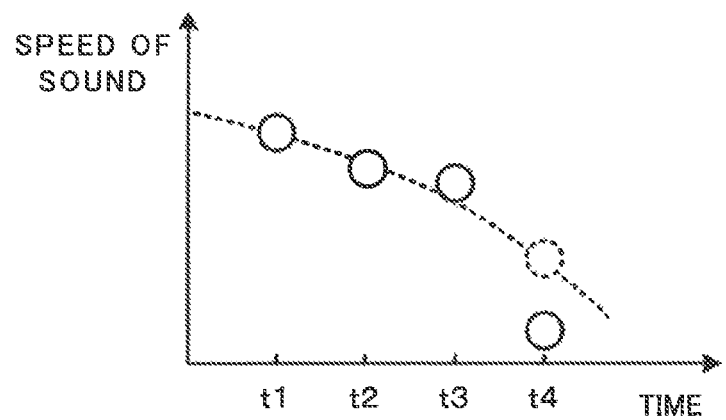
FIG. 12A is a diagram illustrating an exemplary diagnostic method using the diagnostic device according to the fourth example embodiment of the present invention.
Figure 12B:
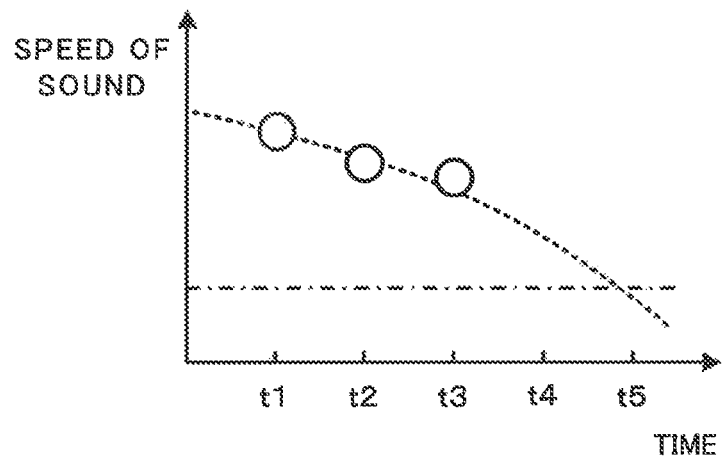
FIG. 12B is a diagram illustrating an exemplary diagnostic method using the diagnostic device according to the fourth example embodiment of the present invention.
Figure 12C:
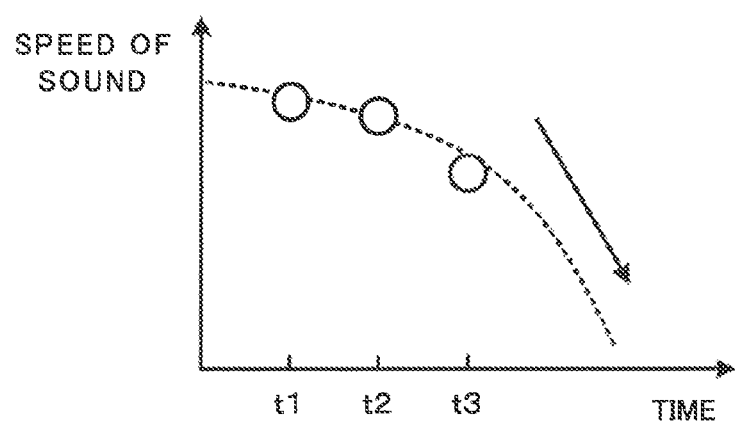
FIG. 12C is a diagram illustrating an exemplary diagnostic method using the diagnostic device according to the fourth example embodiment of the present invention.
Figure 13:
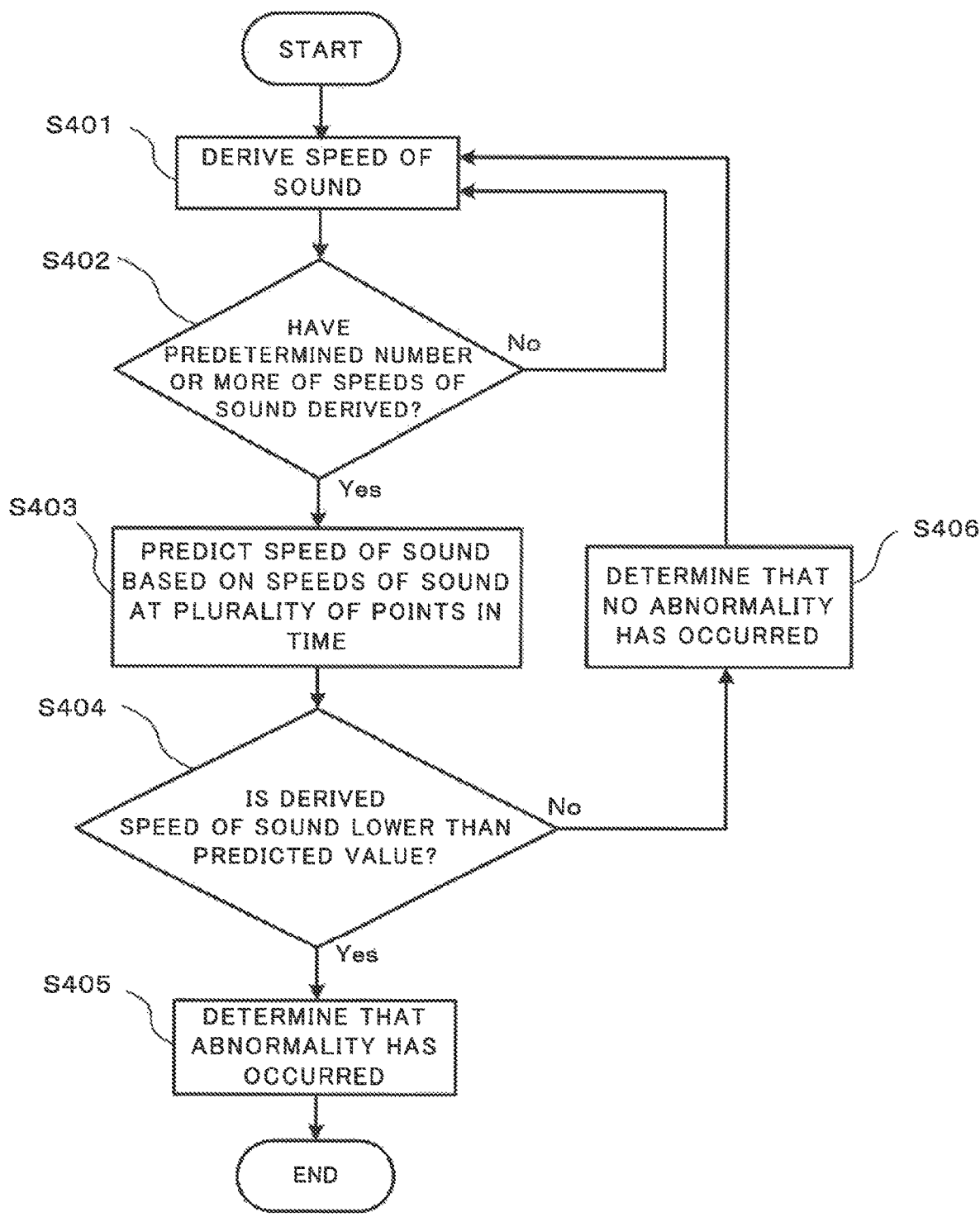
FIG. 13 is a flowchart illustrating an operation of the diagnostic device according to the fourth example embodiment of the present invention.

A fourth example embodiment of the present invention will be described next. FIG. 11 is a diagram illustrating configurations of a diagnostic device and a diagnostic system in the fourth example embodiment of the present invention. FIGS. 12A, 12B, and 12C are diagrams illustrating an exemplary diagnostic method using the diagnostic device in the fourth example embodiment of the present invention. FIG. 13 is a flowchart illustrating an operation of the diagnostic device in the fourth example embodiment of the present invention.

A diagnostic device 400 in the fourth example embodiment of the present invention includes a sound speed derivation unit 120, a sound speed prediction unit 130, a sound speed storage unit 121, and a determination unit 110, as illustrated in FIG. 11. The sound speed derivation unit 120 derives a speed of sound in a structure such as a pipe on the basis of vibration and the like of the structure such as a pipe detected by at least one of vibration detection units 101-1 to 101-$n$, like the sound speed derivation unit 120 in, for example, the second or third example embodiment of the present invention. The sound speed storage unit 121 stores the speed of sound derived by the sound speed derivation unit 120. The sound speed prediction unit 130 predicts the speed of sound in the structure such as a pipe on the basis of the speeds of sound in the structure such as a pipe at a plurality of points in time. The sound speed prediction unit 130 may use the speed of sound in the structure such as a pipe stored in the sound speed storage unit 121 as the speed of sound in the structure such as a pipe at each of a plurality of points in time. The determination unit 110 determines the condition of the structure such as a pipe on the basis of the predicted value of the speed of sound obtained by the sound speed prediction unit 130, and the speed of sound in the structure.

In other words, the diagnostic device 400 in the present example embodiment is different from the diagnostic device 300 in the third example embodiment of the present invention in that the sound speed prediction unit 130 included in the former predicts the speed of sound in the structure such as a pipe on the basis of the speeds of sound in the structure such as a pipe at a plurality of points in time. Further, the diagnostic device 400 in the present example embodiment includes a sound speed storage unit 121 that stores the speeds of sound in the structure such as a pipe at a plurality of points in time described earlier. Other than that, the configuration is the same as that of the diagnostic device 300 in the third example embodiment of the present invention, and the like.

A diagnostic system 40 that uses the diagnostic device 400 in the fourth example embodiment of the present invention may be implemented as in the first to third example embodiments. The diagnostic system 40 that uses the diagnostic device 400 in the fourth example embodiment of the present invention includes the diagnostic device 400 and at least one vibration detection unit including vibration detection units 101-1 to 101-$n$.

In the present example embodiment, the sound speed prediction unit 130 predicts a speed of sound in the structure such as a pipe on the basis of the speeds of sound at a plurality of points in time. In this way, the sound speed prediction unit 130 may improve the accuracy of the predicted value. This, as a result, may improve the determination accuracy of the condition of the pipe or the like in the determination unit 110. In this case, the sound speed prediction unit 130 may use a plurality of speeds of sound during any period for prediction. The sound speed prediction unit 130 may use the plurality of speeds of sound at any interval for prediction.

As an example, the sound speed prediction unit 130 may predict a speed of sound in the structure such as a pipe by obtaining a prediction expression representing a change in the speed of sound in the structure such as a pipe based on the speeds of sound at a plurality of points in time, as illustrated in each of FIGS. 12A, 12B, and 12C.

More specifically, referring to FIG. 12A, the sound speed prediction unit 130 obtains the prediction expression as indicated by a dotted line in FIG. 12A, on the basis of the speeds of sound in the pipe derived at respective times t1 to t3 (solid circles at respective times in FIG. 12A). The sound speed prediction unit 130 obtains a prediction expression by approximating the speeds of sound in the pipe at a plurality of points in time using any type of expression such as a polynomial, for example.

In this case, the determination unit 110 uses, as a predicted value, the speed of sound in the pipe obtained from the prediction expression at a time after time t3.

The determination unit 110 determines that no abnormality has occurred in the pipe when the speed of sound in the pipe derived at time t4 falls within a predetermined range from the value obtained from the prediction expression at the time t4. This applies when the speed of sound in the pipe derived at time t4 is indicated by a dotted circle in FIG. 12A, for example. On the contrary, the determination unit 110 determines that an abnormality has occurred in the pipe when the difference between the speed of sound derived at the time t4 and the value obtained from the prediction expression at the time t4 falls outside the predetermined range (for example, the speed of sound at the time t4 is indicated by a solid circle).

An exemplary operation of the diagnostic device 400 in the present example embodiment will be described below with reference to FIG. 13.

The sound speed derivation unit 120 included in the diagnostic device 400 derives the speed of sound in the structure such as a pipe (step S401). In this case, the sound speed derivation unit 120 derives the speed of sound in the structure such as a pipe on the basis of vibration detected by the vibration detection unit 101, for example. The speed of sound in the structure such as a pipe which is derived is stored in the sound speed storage unit 121. Then, the sound speed derivation unit 120 then determines whether speeds of sound sufficient in number to predict the speed of sound in the structure such as a pipe have been derived (step S402). The sound speed derivation unit 120 determines whether, speeds of sound necessary in number to obtain a prediction expression have been derived for example. In step S402, when the sound speed derivation unit 120 determines that insufficient numbers of speeds of sound have been derived to predict the speed of sound in the structure such as a pipe, the sound speed derivation unit 120 returns to step S401, in which it repeats derivation of a speed of sound.

In step S402, when the sound speed derivation unit 120 determines that speeds of sound sufficient in number to predict the speed of sound in the structure such as a pipe have been derived, the diagnostic device 400 advances to the operation in step S403. In step S403, the sound speed prediction unit 130 predicts the speed of sound in the structure such as a pipe on the basis of the speeds of sound in the structure such as a pipe at a plurality of points in time derived in step S401. As described above, the sound speed prediction unit 130 may predict the speed of sound in the structure such as a pipe by, for example, generating the prediction expression representing a change in speed of sound in the structure such as a pipe.

Next, the determination unit 110 analyzes the condition of the pipe by determining whether the speed of sound derived at a point in time after that used for prediction in step S403, for example, is lower than the predicted value (step S404). When the speed of sound in the structure such as a pipe is lower than the predicted value (Yes in step S404), the determination unit 110 determines that an abnormality has occurred in the pipe to be determined.

When the speed of sound in the structure such as a pipe which is derived is higher than the predicted value in step S404 (No in step S404), the determination unit 110 determines that no abnormality has occurred in the pipe to be determined (step S406). In this case, the diagnostic device 400 returns to step S401, and derives the speed of sound.

As described above, the diagnostic device 400 according to the present example embodiment uses the sound speed prediction unit 130 to predict a speed of sound in the structure such as a pipe on the basis of the speeds of sound in the structure such as a pipe at a plurality of points in time. More specifically, the sound speed prediction unit 130 predicts the speed of sound in the structure such as a pipe by obtaining a prediction expression regarding the speed of sound on the basis of the speeds of sound in the structure such as a pipe at a plurality of points in time. The determination unit 110 determines the condition of the structure such as a pipe on the basis of the predicted value of the speed of sound obtained by the sound speed prediction unit 130, and the speed of sound in the structure. In other words, the determination unit 110 may determine the condition of the structure such as a pipe in consideration of aging of the structure to be determined. Therefore, the diagnostic device 400 in the present example embodiment may accurately determine the condition of the structure according to the individual conditions of the pipe or the like to be determined, like the diagnostic device 300 in the third example embodiment of the present invention. The diagnostic device 400 in the present example embodiment may more accurately determine the condition of the structure such as a pipe than the diagnostic device 300 in the third example embodiment of the present invention, using a prediction expression regarding the speed of sound in predicting a speed of sound in the structure and determining the state. The diagnostic system 40 including the diagnostic device 200 in the present example embodiment has similar advantageous as that of the diagnostic device 400.

Modifications to Fourth Example Embodiment

Some modifications may be applied to the diagnostic device 400 in the present example embodiment. As a modification, the determination unit 110 may predict a period during which an abnormality is determined to have occurred in the pipe by obtaining a period during which the speed of sound in the structure such as a pipe predicted from the prediction expression satisfies a predetermined condition to.

As an example, referring to FIG. 12B, the sound speed prediction unit 130 obtains a prediction expression indicated by a dotted line in FIG. 12B, on the basis of the speeds of sound derived at times t1 to t3. When the determination unit 110 determines that an abnormality has occurred in the pipe as the speed of sound in the pipe reaches the value indicated by an alternate long and short dashed line illustrated in FIG. 12B, for example, the determination unit 110 predicts that an abnormality will occur in the pipe at time t5, at which the speed of sound predicted using a prediction expression falls below the alternate long and short dashed line. The determination unit 110 may thus determine the condition of the pipe in more detail. A user who uses the diagnostic device in the present modification may maintain the pipe or the like, for example, in consideration of the period during which an abnormality occurs in the pipe or the like.

As another modification, the determination unit 110 may determine that an abnormality will occur in the pipe or the like on the basis of the prediction expression itself obtained by the sound speed prediction unit 130.

As an example, referring to FIG. 12C, the sound speed prediction unit 130 obtains a prediction expression indicated by a dotted line in FIG. 12C, on the basis of the speeds of sound derived at times t1 to t3. Considering the prediction expression obtained in this case, the change in the speed of sound is greater after the time t3 than before the time t3. In such a case, the determination unit 110 may determine that an abnormality will occur in the structure such as a pipe, regardless of the determination result of the condition of the pipe or the like based on the predicted value of the speed of sound obtained from the prediction expression and the speed of sound in the pipe or the like. The determination unit 110 may thus determine changes in condition of the pipe in more detail.

As still another modification, the diagnostic device 400 may change the frequency of derivation of the speeds of sound in the structure such as a pipe used to obtain the predicted value for the speed of sound in the structure such as a pipe by the sound speed prediction unit 130, or the frequency of determination by the determination unit 110, on the basis of the determination result obtained by the determination unit 110. For example, when the determination unit 110 determines that no abnormality has occurred in the pipe or the like, but the speed of sound at the point in time in question meets the predetermined condition, the diagnostic device 400 may operate to enhance the frequency of derivation of speeds of sound in steps S401 and S402 of FIG. 13. The diagnostic device 400 may further enhance the frequency of determination by the determination unit 110 in step S404. In this case, the predetermined condition mentioned above may be used as, for example, a reference laxer to a certain extent than that for determining by the determination unit 110 that an abnormality has occurred in the pipe or the like.

When the determination unit 110 determines that no abnormality has occurred in the pipe or the like but the speed of sound in the structure such as a pipe at the time of determination is close to a reference for determining by the determination unit 110 that an abnormality has occurred, it may be considered that an abnormality will occur in the pipe in the near future. In such a case, the diagnostic device 400 may determine that an abnormality has occurred in the pipe by enhancing the frequency of derivation of speeds of sound and the like at early stage.

Fifth Example Embodiment

Figure 14:
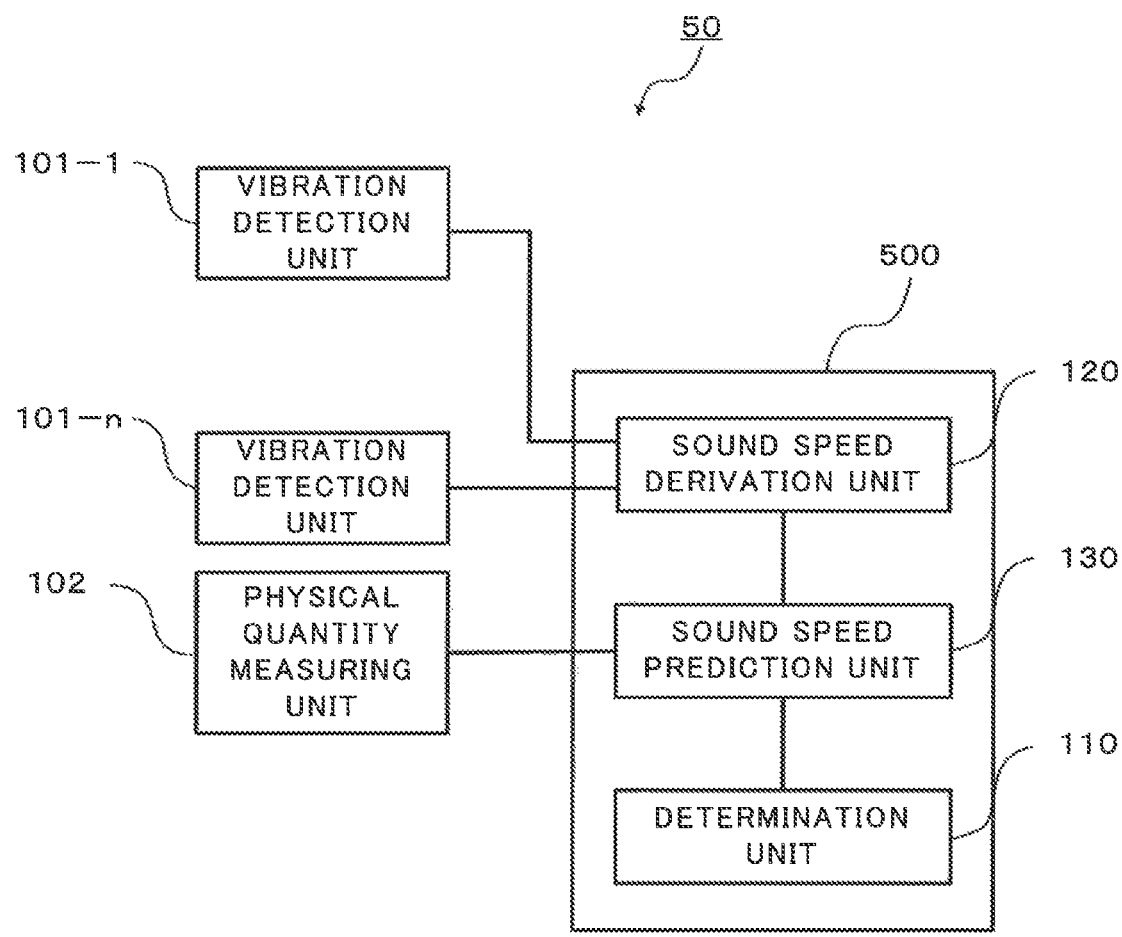
FIG. 14 is a diagram illustrating a configuration of a diagnostic device according to a fifth example embodiment of the present invention.
Figure 15:
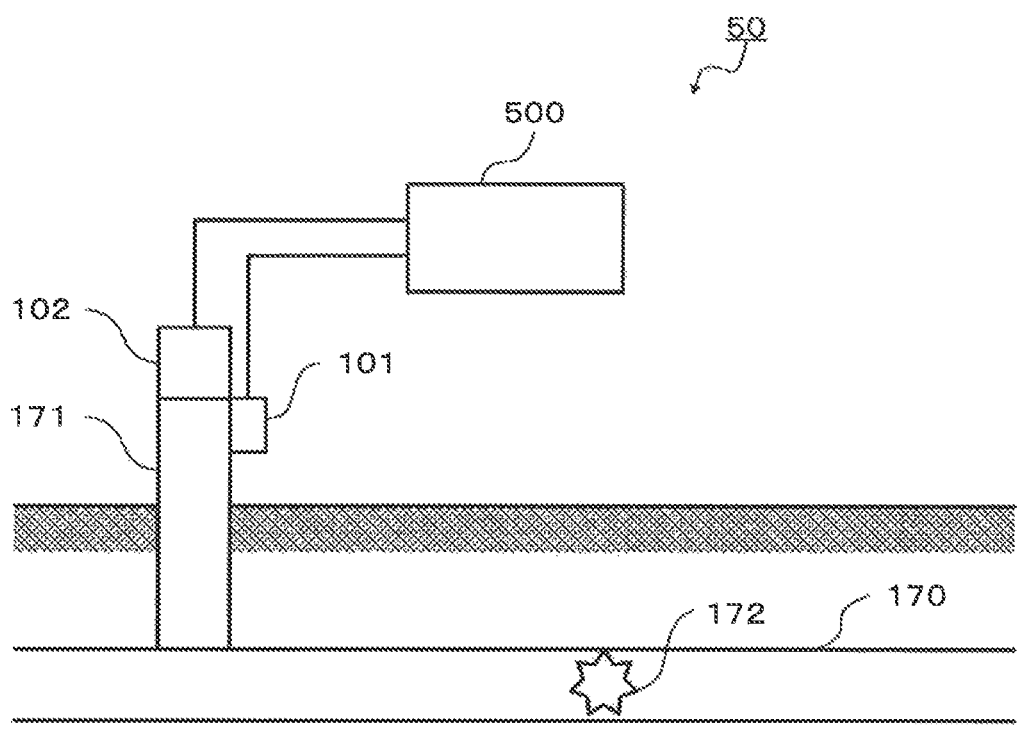
FIG. 15 illustrates an exemplary diagnostic system including the diagnostic device according to the fifth example embodiment of the present invention.
Figure 16:
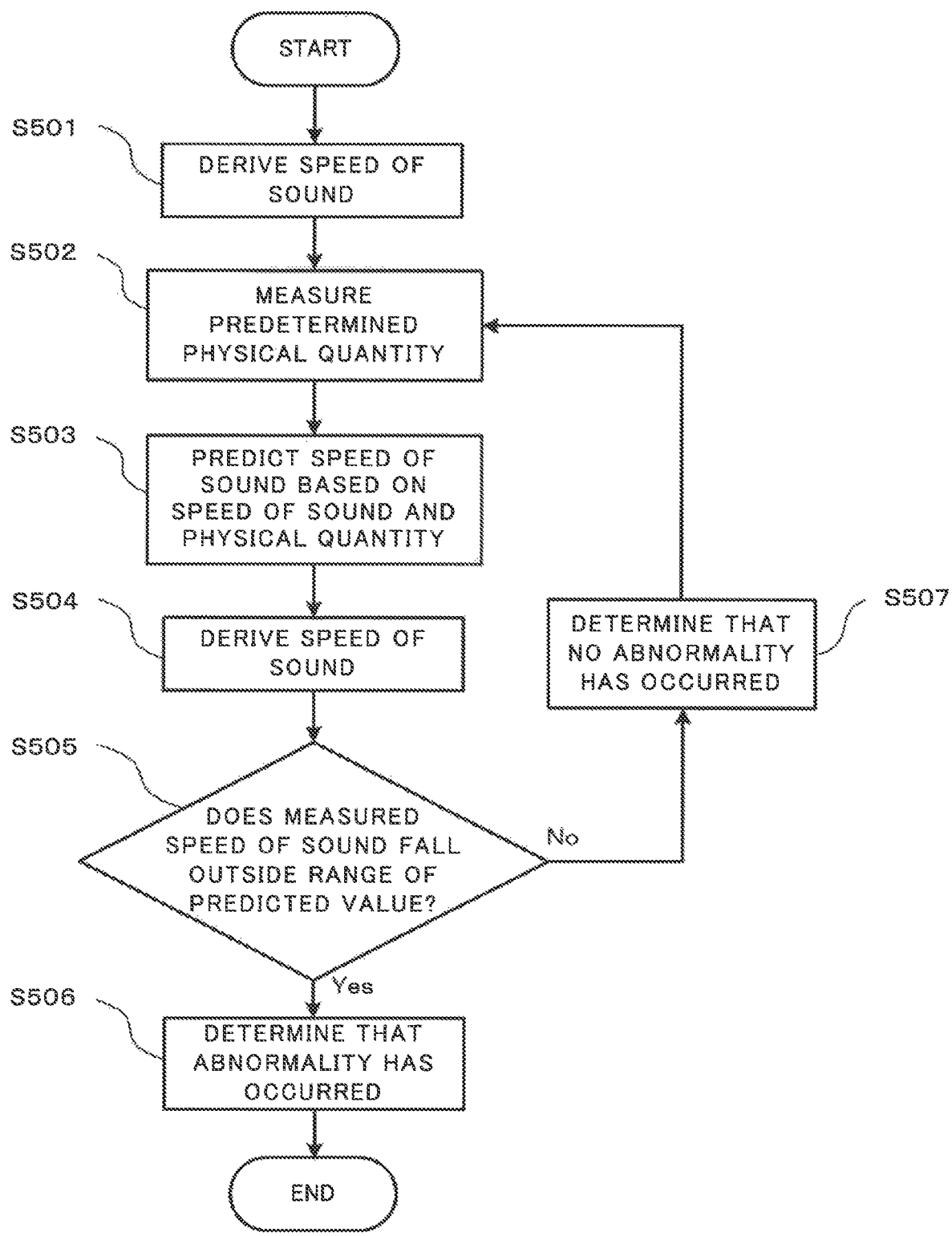
FIG. 16 is a flowchart illustrating an operation of the diagnostic device according to the fifth example embodiment of the present invention.
Figure 17A:
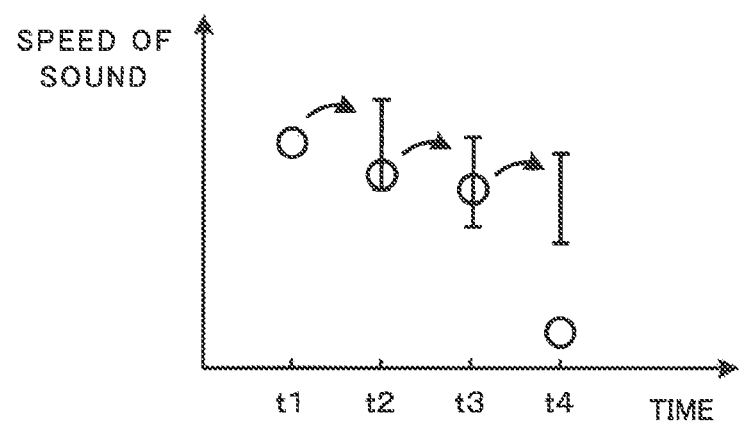
FIG. 17A is a diagram illustrating an exemplary diagnostic method using the diagnostic device according to the fifth example embodiment of the present invention.
Figure 17B:
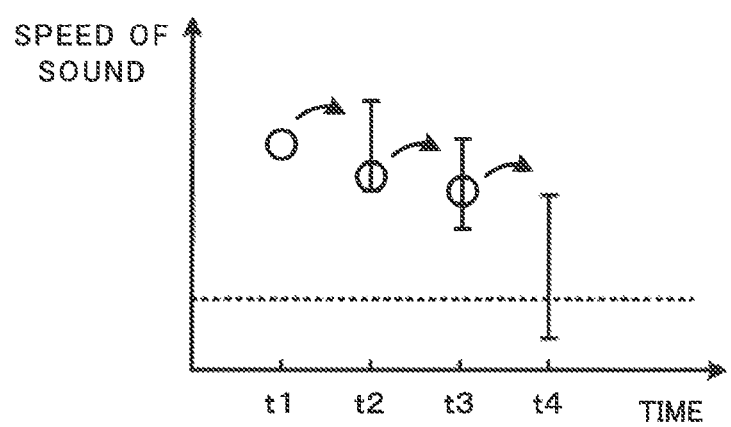
FIG. 17B is a diagram illustrating an exemplary diagnostic method using the diagnostic device according to the fifth example embodiment of the present invention.

A fifth example embodiment of the present invention will be described next. FIG. 14 is a diagram illustrating configurations of a diagnostic device and a diagnostic system in the fifth example embodiment of the present invention. FIG. 15 illustrates an exemplary diagnostic system including the diagnostic device in the fifth example embodiment of the present invention. FIG. 16 is a flowchart illustrating an operation of the diagnostic device in the fifth example embodiment of the present invention. FIGS. 17A and 17B are diagrams illustrating an exemplary diagnostic method using the diagnostic device in the fifth example embodiment of the present invention.

A diagnostic device 500 according to the fifth example embodiment of the present invention includes a sound speed derivation unit 120, a sound speed prediction unit 130, and a determination unit 110, as illustrated in FIG. 14. The sound speed derivation unit 120 derives a speed of sound in a structure such as a pipe on the basis of vibrations and the like of the structure such as a pipe detected by vibration detection units 101-1 to 101-$n$, like the sound speed derivation unit 120 in the second to fourth example embodiments of the present invention, for example. The sound speed prediction unit 130 predicts a speed of sound in the structure such as a pipe based on the speed of sound in the structure such as a pipe and, for example, a physical quantity associated with the pipe or the like measured by a physical quantity measuring unit 102 or a factor that may influence the speed of sound in the pipe or the like. When the structure is the pipe, examples of the physical quantity used in this case include the pressure, flow rate, and temperature of a fluid flowing through the pipe. Examples of the factor that may influence the speed of sound in the pipe or the like include the type of fluid flowing through the pipe. The determination unit 110 determines the condition of the structure such as a pipe on the basis of the predicted value of the speed of sound obtained by the sound speed prediction unit 130, and the speed of sound in the structure.

In other words, the diagnostic device 500 in the present example embodiment is different from the diagnostic device 300 in the third example embodiment of the present invention in that, the sound speed prediction unit 130 included in the former predicts the speed of sound in the structure such as a pipe further on the basis of a physical quantity associated with the pipe or the like. Other than that, the configuration is the same as that of the diagnostic device 300 in the third example embodiment of the present invention, and the like.

A diagnostic system 50 that uses the diagnostic device 500 in the fifth example embodiment may be implemented as illustrated in FIG. 15. The diagnostic system 50 includes the diagnostic device 500, at least one vibration detection unit including vibration detection units 101-1 to 101-$n$ that detect vibration of a pipe 170 as a structure, and a physical quantity measuring unit 102 that measures a physical quantity associated with the pipe 170. The physical quantity measuring unit 102, more specifically, uses a measuring instrument according to the physical quantity used in predicting the speed of sound. For example, a thermometer, a pressure gauge that measures the pressure in the pipe, or a flowmeter that measures the flow rate of a fluid flowing through the pipe is used. The physical quantity measuring unit 102 is attached to the pipe, or an ancillary equipment 171 such as a fire hydrant or a water stop valve mounted on the pipe, like the vibration detection unit 101. However, the physical quantity measuring unit 102 may be attached to an area other than the above-mentioned examples.

In the present example embodiment, the sound speed prediction unit 130 predicts the speed of sound in the structure such as a pipe based on the speed of sound in the structure such as a pipe, and the physical quantity associated with the pipe or the like. The structure such as a pipe may vary in degree of worsening of deterioration according to the surrounding conditions. For the pipe, the pressure, flow rate, temperature, and the like of a fluid flowing through it act as factors that influence deterioration of the pipe in this manner. The speed of sound in the structure such as a pipe is influenced by its material, shape, and installation environment, and factors other than its deterioration condition. In other words, when the structure is the pipe, the speed of sound in the pipe is further influenced by factors such as the pressure, flow rate, temperature, and the like of a fluid flowing through the pipe. In predicting the speed of sound in the structure such as a pipe, the prediction accuracy of the speed of sound in the pipe or the like may be improved by taking these factors that influence the speed of sound into consideration.

As an example, the sound speed prediction unit 130 predicts a speed of sound in the structure such as a pipe from the speed of sound at a particular point in time, and the physical quantity associated with the pipe or the like at that point in time. In the example illustrated in FIG. 17A, the sound speed prediction unit 130 predicts the speed of sound in the pipe at time t2 from the speed of sound in the pipe at time t1, and the physical quantity associated with the pipe or the like at the time t1. In this case, the speed of sound to be predicted may be predicted as the range of speed of sound, as indicated by a vertical bar at the time t2 in FIG. 17A. Referring to FIG. 17A, the sound speed prediction unit 130 similarly predicts a speed of sound in the pipe at time t3 from the speed of sound in the pipe at the time t2, and the physical quantity associated with the pipe or the like at the time t2. Referring to FIG. 17A, the sound speed prediction unit 130 further predicts the speed of sound in the pipe at time t4 from the speed of sound in the pipe at the time t3, and the physical quantity associated with the pipe or the like at the time t4.

In the above-mentioned case, the determination unit 110 may determine that no abnormality has occurred in the pipe or the like when the speed of sound in the structure such as a pipe falls within the range of speed of sound predicted by the sound speed prediction unit 130. The determination unit 110 may determine that an abnormality has occurred in the pipe or the like when the speed of sound in the structure such as a pipe falls outside the range of speed of sound predicted by the sound speed prediction unit 130.

An exemplary operation of the diagnostic device 500 in the present example embodiment will be described below with reference to FIG. 16.

In the diagnostic device 500, the sound speed derivation unit 120 derives a speed of sound in the structure such as a pipe (step S501). In this case, the sound speed derivation unit 120 derives a speed of sound in the structure such as a pipe on the basis of, for example, vibration detected by the vibration detection unit 101.

Then, the sound speed prediction unit 130 measures a predetermined physical quantity associated with the pipe (step S502). In this case, the sound speed prediction unit 130 measures a physical quantity using the physical quantity measuring unit 102. Next, the sound speed prediction unit 130 predicts the speed of sound in the structure such as a pipe on the basis of the speed of sound in the structure such as a pipe derived in step S501, and the physical quantity associated with the pipe measured in step S502 (step S503).

Then, the sound speed derivation unit 120 derives the speed of sound in the structure such as a pipe again (step S504). The speed of sound derived in this case is the speed of sound in the structure such as a pipe at the point in time at which a predicted value has been calculated in step S503.

Then, the determination unit 110 determines whether the speed of sound in the structure such as a pipe or the like derived in step S504 falls outside the range of predicted value of the speed of sound obtained in step S503 (step S505). When the speed of sound in the structure such as a pipe falls outside the range of predicted value (Yes in step S505), the determination unit 110 determines that an abnormality has occurred in the pipe or the like to be determined.

When the derived speed of sound in the structure such as a pipe falls within the range of predicted value in step S505 (No in step S505), the determination unit 110 determines that no abnormality has occurred in the pipe to be determined. In this case, the diagnostic device 300 returns to step S502, and measures the physical quantity associated with the pipe again. In step S503, the sound speed prediction unit 130 predicts a speed of sound in the structure such as a pipe based on the previous speed of sound derived in step S504, and the physical quantity associated with the pipe measured again in step S502.

As described above, the diagnostic device 500 according to the present example embodiment uses the sound speed prediction unit 130 to predict the speed of sound in the structure such as a pipe based on the speed of sound in the structure such as a pipe, and the physical quantity associated with the structure such as a pipe. The speed of sound in the structure such as a pipe may change in a manner that depends on the physical quantity associated with the pipe or the like. Thus, using the physical quantity associated with the pipe or the like, the sound speed prediction unit 130 may more accurately predict a speed of sound in the structure such as a pipe according to the individual conditions of the pipe or the like. The determination unit 110 determines the condition of the structure such as a pipe, based on the predicted value of the speed of sound obtained by the sound speed prediction unit 130 and the speed of sound in the structure. The diagnostic device 500 in the present example embodiment may more accurately determine the condition of the structure than the diagnostic device 300 in the third example embodiment of the present invention.

The configuration of the diagnostic device 500 in the fifth example embodiment may be used in combination of the diagnostic device 400 in the fourth example embodiment of the present invention where necessary.

Modifications to Fifth Example Embodiment

Some modifications may be made to the diagnostic device 500 in the present example embodiment. As a modification, the determination unit 110 may determine that an abnormality will occur in the pipe by determining whether the range of the speed of sound in the pipe predicted by the sound speed prediction unit 130 exceeds a predetermined threshold.

As an example, referring to FIG. 17B, the sound speed prediction unit 130 predicts a predicted value for the speed of sound at the next time point as a range of speed of sound, on the basis of the speeds of sound derived at respective times t1 to t3, and the physical quantity associated with the pipe at each point in time.

In this case, the determination unit 110 may determine that an abnormality will occur in the pipe when the predicted range of speed of sound is lower or higher than the predetermined threshold. When the determination unit 110 determines that an abnormality has occurred in the pipe in the case where, for example, the speed of sound in the pipe reaches the value indicated by an alternate long and short dashed line illustrated in FIG. 17B, the determination unit 110 predicts that an abnormality will occur in the pipe at time t4 at which the predicted range of speed of sound intersects the alternate long and short dashed line. The determination unit 110 may thus determine the condition of the pipe in more detail. A user who uses the diagnostic device in the present modification may maintain the pipe or the like in consideration of, for example, the period during which an abnormality occurs in the pipe or the like.

As another modification, the diagnostic device 500 may be configured to control controllable ones of physical quantities used to predict a speed of sound in the structure such as a pipe by the sound speed prediction unit 130 when the determination unit 110 determines that an abnormality has occurred in the pipe or the like. For example, when the pressure in the pipe is used to predict the speed of sound in the structure such as a pipe by the sound speed prediction unit 130, the diagnostic device 500 may perform control to lower the pressure in the pipe when the determination unit 110 determines that an abnormality has occurred in the pipe or the like. In addition, when the pressure in the pipe is used to predict a speed of sound in the structure such as a pipe by the sound speed prediction unit 130, the diagnostic device 500 may perform control to reduce the flow rate in the pipe when the determination unit 110 determines that an abnormality has occurred in the pipe or the like. In this case, the diagnostic device 500 may control the physical quantity not only by directly controlling it but also by controlling it using other devices. Thus, the diagnostic device 500 may not only simply determine the condition of the pipe or the like but also suppress worsening of an abnormality in the pipe or the like when the abnormality has occurred in the pipe or the like.

Each example embodiment of the present invention has been described above, including a description of the diagnostic device and the like in this example embodiment assuming, as an example, that the structure to be determined is a pipe. However, the structure to be determined by the diagnostic device and the like in each example embodiment of the present invention is not limited to a pipe. The diagnostic device and the like in each example embodiment of the present invention may be applicable to, for example, a bridge or a building as a structure to be determined.

Although the present invention has been described above with reference to example embodiments, the present invention is not limited to the above-described example embodiments. Various changes that would be understood by those skilled in the art may be made to the configurations and details of the present invention within the scope of the present invention. In addition, the configurations in the respective example embodiments may be combined with each other without departing from the gist of the present invention.

This application claims priority based on Japanese Patent Application No. 2014-154522 filed on Jul. 30, 2014, the disclosure of which is incorporated herein in its entirety.

REFERENCE SIGNS LIST 10, 20, 30, 40, 50 diagnostic system
100, 200, 300, 400, 500 diagnostic device
101 vibration detection unit
102 physical quantity measuring unit
110 determination unit
120 sound speed derivation unit
121 sound speed storage unit
130 sound speed prediction unit
170 pipe
171 ancillary equipment
172 vibration source position
500 information processing device
501 CPU
502 ROM
503 RAM
504 program
505 storage device
506 storage medium
507 drive device
508 communication interface
509 communication network
510 I/O interface
511 bus

The invention claimed is:

1. A diagnostic device comprising a processor configured to:
   derive a speed of sound in a structure based on vibration of the structure detected by a vibration detector;
   predict the speed of sound at a later point in time after a plurality of points in time, in the structure based on at least the derived speed of sound in the structure, an age of the structure at the later point in time, and the determined speed of sound in the structure at each of the plurality of points in time; and
   determine a condition of the structure based on the derived speed of sound in the structure, the predicted speed of sound in the structure, and the age of the structure.

2. The diagnostic device according to claim 1, wherein the processor is configured to determine that an abnormality has occurred in the structure when the derived speed of sound in the structure exceeds a reference speed of sound.

3. The diagnostic device according to claim 1, wherein the processor is configured to determine that an abnormality has occurred in the structure when the derived speed of sound in the structure is different than the predicted value of the speed of sound beyond a predetermined range.

4. The diagnostic device according to claim 1, wherein the processor is configured to:
   generate a prediction expression representing a change in the speed of sound in the structure based on the speed of sound in the structure at each of a plurality of points in time, and
   determine a condition of the structure based on a predicted value of the speed of sound in the structure obtained from the prediction expression, and the speed of sound in the structure.

5. The diagnostic device according to claim 4, wherein the processor is configured to determine a time when the speed of sound in the structure represented by the prediction expression exceeds a reference speed of sound as a time when an abnormality occurs in the structure.

6. The diagnostic device according to claim 1, wherein the processor is configured to predict the speed of sound in the structure based on the speed of sound in the structure and a physical quantity associated with the structure.

7. The diagnostic device according to claim 6, wherein the processor is configured to predict the speed of sound in the structure at a point in time after a predetermined point in time based on the speed of sound in the structure at the predetermined point in time, and the physical quantity at the predetermined point in time.

8. The diagnostic device according to claim 6, wherein the structure includes a pipe, and
   the physical quantity includes at least one of a pressure, a flow rate, and a temperature of a fluid flowing through the pipe.

9. A diagnostic method including steps performed by a processor, the method comprising:
   deriving a speed of sound in a structure based on vibration of the structure detected by a vibration detector;

predicting the speed of sound at a later point in time after a plurality of points in time, in the structure based on at least the derived speed of sound in the structure, an age of the structure at the later point in time, and the determined speed of sound in the structure at each of the plurality of points in time; and determining a condition of the structure based on the derived speed of sound in the structure, the predicted speed of sound in the structure, and the age of the structure.

10. A non-transitory computer-readable recording medium storing a program for causing a computer to perform:

deriving a speed of sound in a structure based on vibration of the structure detected by a vibration detector;

predicting the speed of sound at a later point in time after a plurality of points in time, in the structure based on at least the derived speed of sound in the structure an age of the structure at the later point in time, and the determined speed of sound in the structure at each of the plurality of points in time; and determining a condition of the structure based on the derived speed of sound in the structure, the predicted speed of sound in the structure, and the age of the structure.

* * * * *